(12) United States Patent
Kitahara et al.

(10) Patent No.: US 11,133,950 B2
(45) Date of Patent: *Sep. 28, 2021

(54) RECEPTION APPARATUS, RECEPTION METHOD, TRANSMISSION APPARATUS, AND TRANSMISSION METHOD

(71) Applicant: Saturn Licensing LLC, New York, NY (US)

(72) Inventors: Jun Kitahara, Shizuoka (JP); Naohisa Kitazato, Tokyo (JP); Yasuaki Yamagishi, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/419,880

(22) Filed: May 22, 2019

(65) Prior Publication Data

US 2019/0342110 A1 Nov. 7, 2019

Related U.S. Application Data

(63) Continuation of application No. 15/310,489, filed as application No. PCT/JP2015/063270 on May 8, 2015, now Pat. No. 10,333,728.

(30) Foreign Application Priority Data

May 22, 2014 (JP) ................................ 2014-106134

(51) Int. Cl.
*H04L 12/18* (2006.01)
*H04N 21/238* (2011.01)
(Continued)

(52) U.S. Cl.
CPC ...... *H04L 12/1886* (2013.01); *H04L 12/1845* (2013.01); *H04L 45/745* (2013.01); *H04N 21/238* (2013.01); *H04N 21/438* (2013.01)

(58) Field of Classification Search
CPC ............. H04L 12/1845; H04L 12/1886; H04L 45/745; H04N 21/238; H04N 21/438
See application file for complete search history.

(56) References Cited

U.S. PATENT DOCUMENTS 10,333,728 B2 * 6/2019 Kitahara ............. H04L 12/1886
2002/0015093 A1 2/2002 Dureau et al.
(Continued)

FOREIGN PATENT DOCUMENTS

JP 2012-156712 8/2012
WO WO-2015126181 A2 * 8/2015 ........... H04L 69/323

OTHER PUBLICATIONS

Office Action dated Jun. 25, 2019 in Japanese Patent Application No. 2016-521032 with English translation.
(Continued)

*Primary Examiner* — Rina C Pancholi
(74) *Attorney, Agent, or Firm* — Oblon, McClelland, Maier & Neustadt, L.L.P.

(57) ABSTRACT

The present technology includes a reception apparatus, including reception circuitry and processing circuitry. The reception circuitry is configured to receive a broadcast wave of digital broadcasting using an IP (Internet Protocol) transmission system. The processing circuitry is configured to perform filtering processing on a packet by using filtering information provided in a header of the packet. The packet is transmitted via the broadcast wave and carries low layer signaling (LLS) information in a payload of the packet.

12 Claims, 22 Drawing Sheets

(51) Int. Cl.
*H04N 21/438* (2011.01)
*H04L 12/741* (2013.01)

(56) References Cited

U.S. PATENT DOCUMENTS

| | | |
|---|---|---|
| 2004/0170182 A1 | 9/2004 | Higashida et al. |
| 2008/0159279 A1* | 7/2008 | Younis .............. H04N 21/23608 370/389 |
| 2009/0007207 A1* | 1/2009 | Kashalkar ............ H04H 20/426 725/113 |
| 2009/0122741 A1 | 5/2009 | Chang et al. |
| 2013/0058482 A1 | 3/2013 | Hirayama |
| 2013/0282870 A1* | 10/2013 | Dewa ...................... H04W 4/18 709/219 |
| 2015/0036822 A1 | 2/2015 | Hirayama |
| 2016/0226939 A1* | 8/2016 | Kwak ................. H04L 65/4076 |

OTHER PUBLICATIONS

Extended European Search Report dated Mar. 28, 2019 in European Patent Application No. 19159098.3.
Extended European Search Report dated Oct. 2, 2017 in corresponding European Patent Application No. 15796405.7, 7 pages.
Office Action dated Mar. 5, 2019 in Japanese Patent Application No. 2016-521032 (With English Translation).
Office Action dated Mar. 28, 2019 in European Patent Application No. 19159098.3.
Hamaguchi, et al., "Developing Convergence System of Broadcasting and Telecommunications; Based upon Applications Controlled by IP Multicast Packets and IPDC: Report of Operational Test of "Chayamachi TV", a Specific District of White Space", ITE Technical Report vol. 37, No. 41, Oct. 2013, pp. 13-16.
"Digital Broadcasting Handbook", URL http://www.ohmsha.co.ip/, Nishikawa & Associates received on Jun. 17, 2015, 27 pages and 46 pages of English Translation.

* cited by examiner

| Element | Description |
|---|---|
| C0 | Represent whether or not signaling data is compressed (algorithm) |
| Type | Type of signaling data |
| Filter_Extension | Filtering condition set for each Type |
| Data_Version | Data version of signaling data |

FIG.5

| Value | Element | Description |
|---|---|---|
| 0 | uncompress | Not compressed |
| 1 | zip | Compressed in zip format |
| 2 | BiM | Binary format for MPEG-7 data |
| 3 | reserved | |

FIG.6

| Value | Element | Description |
|---|---|---|
| 0 | ALL | SCD+RRD+EAD |
| 1 | SCD | Service Configuration Description |
| 2 | RRD | Region Rating Description |
| 3 | EAD | Emergency Alert Description |
| 4-63 | | Reserved |

Filter extension

Type=EAD

Example 1: | 00000 | 00 | Reserved |

Zip code  Priority

| Element | Description |
|---|---|
| Zip code | Specify region with zip code (5 digits) |
| Priority | Represent priority. 0(Low)–3(High) |

Example 2: | Fi_id | value |

Filter ID  Value

| Element | Description |
|---|---|
| Filter ID | Filter identifier |
| Value | Filter value. Content of value is defined for each filter ID |

| Element/Attribute(with@) | Cardinality | Description |
|---|---|---|
| Scd | 1 | Service configuration description |
| @majorProtocolVersion | 0..1 | Major Protocol Version default= "1" |
| @minorProtocolVersion | 0..1 | Minor Protocol Version default= "0" |
| @RFchannelId | 1 | RF channel ID |
| @name | 0..1 | Broadcaster name for each Physical Channel |
| Tuning_RF | 1 | |
|   @frequency | 1 | Center frequency of this RF channel |
|   PreambleL1Pre | 0..1 | Preamble L1pre data |
| BBPStream | 1..n | BBP stream |
|   @bpStreamId | 1 | BBP stream ID |
|   @payloadType | 1 | BBP payload type "ipv4","ipv6","ts" |
|   @name | 0..1 | BBP stream name |
|   ESGBootstrap | 0..1 | Access information for ESG |
|     ESGProvider | 1..n | ESG provider |
|       @providerName | 1 | ESG provider name |
|       ESGBroadcastLocation | 0..1 | ESG location from broadcast |
|         @RFchannelId | 1 | RF channel ID for ESG service |
|         @BBPStreamId | 1 | BBP stream ID for ESG service |
|         @ESGServiceId | 1 | Service ID for ESG service |
|       ESGBroadbandLocation | 0..1 | ESG location from broadband |
|         @ESGurl | 1 | URL for ESG files |
|   ClockReferenceInformation | 0..1 | Clock Reference related information |
|     @sourceIPAddress | 1 | Source IP address for Clock reference transmission |
|     @destinationIPAddress | 1 | Destination IP address for Clock reference transmission |
|     @portNum | 1 | UDP port number for Clock reference transmission |
|     @clockReferenceFormat | 0..1 | Clock reference type "NTPnormal" , "NTP27M" |
|   Tuning_BBPS | 1 | Physical parameter |
|     @plpId | 1 | PLP id for this BBP stream |
|     PreambleL1post | 0..1 | |
|   Service | 1..n | Service |
|     @serviceId | 1 | Service ID |
|     @serviceType | 1 | Service type "continuous", "scripted", "esg" |
|     @hidden | 0..1 | Hidden service or not "on" , "off" |
|     @hiddenGuide | 0..1 | Hidden service on ESG "on", "off" |
|     @shortName | 1 | Short service name ≤7 character |
|     @longName | 0..1 | Long service name |
|     @accessControl | 0..1 | Access controlled service or not "on", "off" |
|     SourceOrigin | 1 | Original service as source |
|       @country | 1 | Country code |
|       @originalRFChannelId | 1 | Original RF channel ID |
|       @bpStreamId | 1 | BBP stream ID |
|       @serviceId | 1 | Service ID |
|     SCSbootstrap | 1 | Access information for service channel |
|       @sourceIPAddress | 1 | Source IP address to transmit service |
|       @destinationIPAddress | 1 | Destination IP address to transmit service |
|       @portNum | 1 | Port number to transmit SCS |
|       @tsi | 1 | FLUTE Session TSI to transmit SCS |
|     AssociatedService | 0..n | Associated service |
|       @RFChannelId | 0..1 | RF channel ID |
|       @bpStreamId | 0..1 | BBP stream ID |
|       @serviceId | 1 | Service ID |

FIG.11

Rrd

| Element/Attribute (with@) | Cardinality | Description |
|---|---|---|
| Rrd | | Rating region description |
| RatingRegionName | 1 | Rating Region "us", "canada", "mexico", etc |
| RatingRegion | 1 | Rating Region code |
| TableVersion | 1 | RRD version |
| Dimension | 1..255 | Dimension |
| RatingDimensionName | 1 | Rating Dimension name |
| RatingDimension | 1 | Rating Dimension code |
| GraduatedScale | 1 | Graduated Scale or Not |
| DimensionValue | 1..16 | Dimension value |
| RatingValueText | 1 | Rating Value in text |
| AbbrevValueText | 1 | Abbrev rating value |
| RatingValue | 0..15 | Rating value |
| RatingTag | 1 | Rating tag |

FIG. 12

EAD

| Element/Attribute(with@) | Cardinality | Description |
|---|---|---|
| Ead | 1 | Emergency alert description |
| AutomaticTuningService | 0..1 | Automatic tuning service when Wake-up |
| @RFchannelId | 0..1 | RFchannel ID for Automatic tuning service |
| @bbpStreamId | 0..1 | BBP stream ID for Automatic tuning service |
| @serviceId | 1 | Service ID for Automatic tuning service |
| EAMessage | 0..n | Emergency alert message |
| @eaMessageId | 1 | Emergency alert ID |
| @eaPriority | 1 | Priority of Emergency alert |
| EAMessageData | 0..1 | Subtitle information of Emergency alert |
| EAApplication | 1 | Emergency alert application(TDO) |
| @applicationId | 1 | Application ID |
| EAService | 0..n | Emergency alert NRT service |
| @serviceId | 1 | Service ID |
| @serviceType | 1 | Service type "nrt", "adjunct_shared" |
| EAWww | 0..n | Emergency alert site |
| @uri | 1 | URL for Emergency alert site |

FIG.13

RECEPTION APPARATUS, RECEPTION METHOD, TRANSMISSION APPARATUS, AND TRANSMISSION METHOD

CROSS REFERENCE TO RELATED APPLICATIONS

This application is a continuation of U.S. Ser. No. 15/310,489, filed Nov. 11, 2016, which is a U.S. National Phase of International Patent Application No. PCT/JP2015/063270 filed on May 8, 2015, which claims priority to Japanese Patent Application No. JP 2014-106134 filed in the Japan Patent Office on May 22, 2014. Each of the above-referenced applications is hereby incorporated herein by reference in its entirety.

TECHNICAL FIELD

The present technology relates to a reception apparatus, a reception method, a transmission apparatus, and a transmission method, and more particularly to a reception apparatus, a reception method, a transmission apparatus, and a transmission method, by which efficient filtering processing can be performed.

BACKGROUND ART

In the standard for digital broadcasting in each country, the MPEG2-TS (Moving Picture Experts Group phase 2-Transport Stream) system is employed as a transmission system (e.g., see Patent Document 1). In the future, it is expected to provide more advanced services by introducing an IP transmission system. In the IP transmission system, an IP (Internet Protocol) packet used in the communication field is used for digital broadcasting.

Patent Document 1: Japanese Patent Application Laid-open No. 2012-156712

SUMMARY

Problem to be Solved

Incidentally, in the digital broadcasting using the IP transmission system, various kinds of data are transmitted in units of packets. Therefore, it is required to perform efficient filtering processing on the packet to be capable of acquiring necessary information. However, such a technology system relating to filtering processing is not established.

The present technology has been made in view of the above circumstances to be capable of performing efficient filtering processing in digital broadcasting using the IP transmission system.

Means for Solving the Problem

A reception apparatus according to a first aspect of the present technology is a reception apparatus, including: a reception unit that receives a broadcast wave of digital broadcasting using an IP (Internet Protocol) transmission system; and a filtering processing unit that performs filtering processing on a packet by using filtering information, the filtering information being provided in a header of the packet, the packet being transmitted in a baseband stream in a first layer via the broadcast wave, the first layer being lower than an IP layer in a hierarchy of a protocol of the IP transmission system.

The packet may be an LLS (Low Layer Signaling) packet, the filtering information may be provided in an LLS header of the LLS packet, first signaling data may be provided in an LLS payload of the LLS packet, and the filtering processing unit may perform filtering processing on the first signaling data stored in the LLS packet by using the filtering information provided in the LLS header.

The filtering information may include at least one piece of information of compression information, type information, extended filter information, and version information, the compression information representing whether or not the first signaling data is compressed, the type information representing a type of the first signaling data, the extended filter information representing extended filtering information set for each type of the first signaling data, the version information representing a version of the first signaling data.

Information representing priority may be specified in the extended filter information.

Information for identifying a region may be specified in the extended filter information.

An arbitrarily defined filter ID and a value of the filter ID may be specified in relation to each other in the extended filter information.

First information, second information, and third information may be transmitted in the first signaling data, the first information representing a configuration of the stream and a configuration of a service, the service being included in the stream, the second information representing rating information, the third information representing information on emergency notice.

The first information may be SCD (Service Configuration Description), the second information may be RRD (Region Rating Description), and the third information may be EAD (Emergency Alerting Description).

Second signaling data may be transmitted in a second layer through a FLUTE (File Delivery over Unidirectional Transport) session, the second layer being higher than the IP layer.

The reception apparatus may be an independent apparatus or may be an internal block configuring a single apparatus.

A reception method according to the first aspect of the present technology is a reception method corresponding to the reception apparatus according to the first aspect of the present technology.

In the reception apparatus and reception method according to the first aspect of the present technology, a broadcast wave of digital broadcasting using an IP transmission system is received; and filtering processing is performed on a packet by using filtering information, the filtering information being provided in a header of the packet, the packet being transmitted in a baseband stream in a first layer via the broadcast wave, the first layer being lower than an IP layer in a hierarchy of a protocol of the IP transmission system.

A transmission apparatus according to a second aspect of the present technology is a transmission apparatus, including: a first acquisition unit that acquires one or more components constituting a service; a second acquisition unit that acquires first signaling data; and a transmission unit that transmits the first signaling data as well as the one or more components via a broadcast wave of digital broadcasting using an IP transmission system, the first signaling data being stored in a packet, filtering information being provided in a header of the packet, the filtering information being used to perform filtering processing on the packet, the packet being transmitted in a baseband stream in a first layer via the broadcast wave, the first layer being lower than an IP layer in a hierarchy of a protocol of the IP transmission system.

The packet may be an LLS packet, the filtering information may be provided in an LLS header of the LLS packet, and first signaling data may be provided in an LLS payload of the LLS packet.

The filtering information may include at least one piece of information of compression information, type information, extended filter information, and version information, the compression information representing whether or not the first signaling data is compressed, the type information representing a type of the first signaling data, the extended filter information representing extended filtering information set for each type of the first signaling data, the version information representing a version of the first signaling data.

Information representing priority may be specified in the extended filter information.

Information for identifying a region may be specified in the extended filter information.

An arbitrarily defined filter ID and a value of the filter ID may be specified in relation to each other in the extended filter information.

First information, second information, and third information may be transmitted in the first signaling data, the first information representing a configuration of the stream and a configuration of a service, the service being included in the stream, the second information representing rating information, the third information representing information on emergency notice.

The first information may be SCD, the second information may be RRD, and the third information may be EAD.

Second signaling data may be transmitted in a second layer through a FLUTE (File Delivery over Unidirectional Transport) session, the second layer being higher than the IP layer.

The transmission apparatus may be an independent apparatus or may be an internal block configuring a single apparatus.

A transmission method according to the second aspect of the present technology is a transmission method corresponding to the transmission apparatus according to the second aspect of the present technology.

In the transmission apparatus and transmission method according to the second aspect of the present technology, one or more components constituting a service are acquired; first signaling data is acquired; and the first signaling data as well as the one or more components are transmitted via a broadcast wave of digital broadcasting using an IP transmission system, the first signaling data being stored in a packet, filtering information being provided in a header of the packet, the filtering information being used to perform filtering processing on the packet, the packet being transmitted in a baseband stream in a first layer via the broadcast wave, the first layer being lower than an IP layer in a hierarchy of a protocol of the IP transmission system.

Effects

In accordance with the first aspect and the second aspect of the present technology, it is possible to perform efficient filtering processing.

It should be noted that the effect described here is not necessarily limitative and may be any effect described in the present disclosure.

BRIEF DESCRIPTION OF DRAWINGS

FIG. 5 A diagram showing detailed content of elements of the LLS header.

FIG. 6 A diagram showing detailed content of compression information.

FIG. 7 A diagram showing detailed content of type information.

FIG. 8 A diagram showing detailed content of extended filter information.

FIG. 11 A diagram showing an example of a syntax of an SCD.

FIG. 12 A diagram showing an example of a syntax of an RRD.

FIG. 13 A diagram showing an example of a syntax of an EAD.

DESCRIPTION OF PREFERRED EMBODIMENTS

Hereinafter, embodiments of the present technology will be described with reference to the drawings. Note that descriptions will be made in the following order.

1. Outline of Digital Broadcasting in IP Transmission System
2. Structure of Packet
3. Application Example
4. Data Structure of LLS
5. Configuration of Broadcast Communication System
6. Specific Flows of Processing Executed by Apparatuses
7. Configuration of Computer

1. OUTLINE OF DIGITAL BROADCASTING IN IP TRANSMISSION SYSTEM (Configuration of Broadcast Wave in IP Transmission System)

Figure 1:
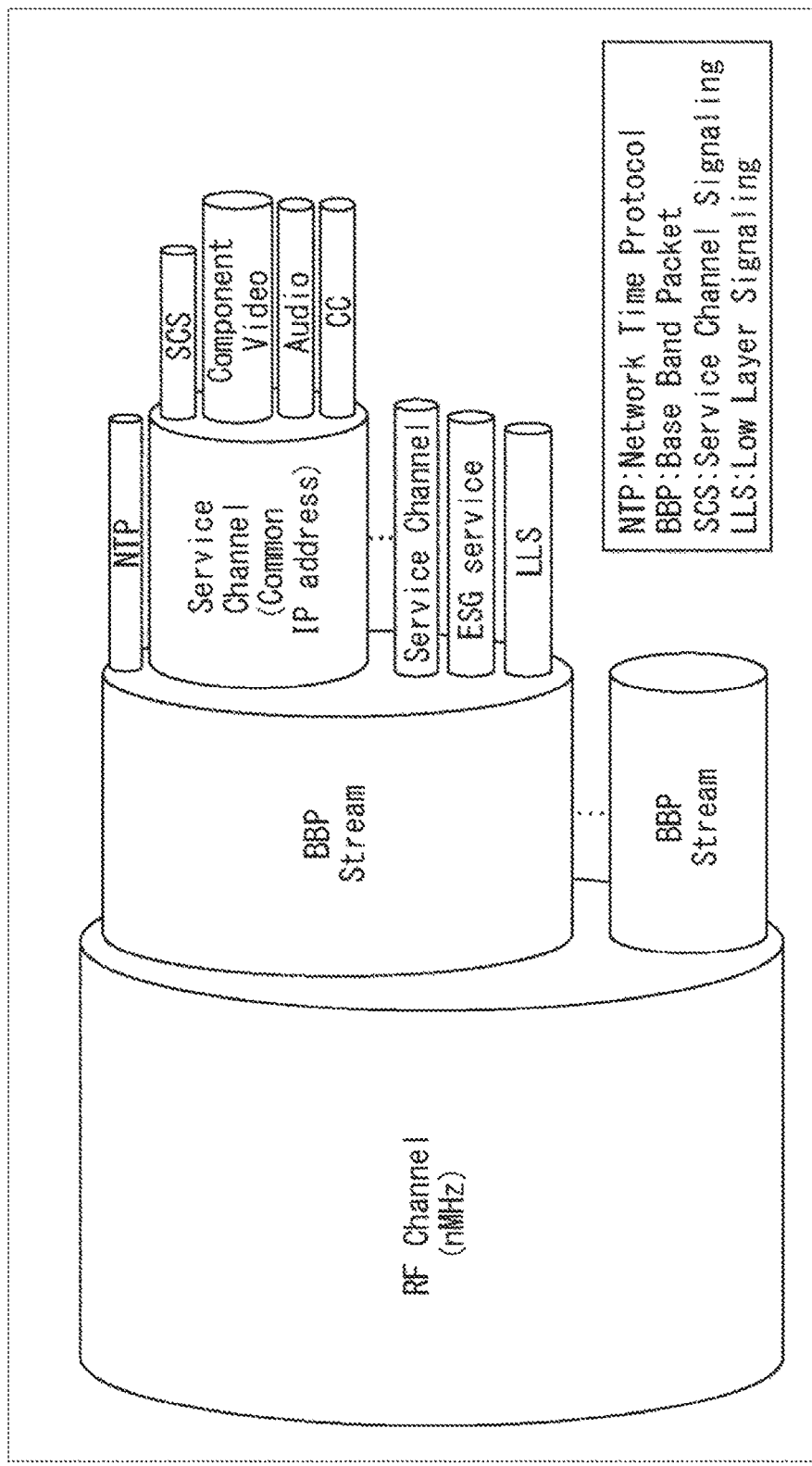
FIG. 1 A diagram showing a configuration of a broadcast wave of digital broadcasting in an IP transmission system.

FIG. 1 is a diagram showing a configuration of a broadcast wave of the digital broadcasting in the IP transmission system.

As shown in FIG. 1, a plurality of BBP streams are transmitted in a broadcast wave (RF Channel) having a predetermined frequency band. Further, each of the BBP streams includes an NTP (Network Time Protocol), a plurality of service channels, an ESG (ESG Service), and an LLS (Low Layer Signaling).

The NTP, the service channels, and the ESG are transmitted according to a UDP/IP protocol while the LLS is transmitted in the BBP stream. The NTP is time information and can be common to the plurality of service channels. The ESG (Electronic Service Guide) is an electronic service guide that includes metadata relating to a program. The LLS is low layer signaling data.

The service channels each include components such as video data, audio data, and closed captioning (CC) and an SCS (Service Channel Signaling). The SCS is signaling data in units of services. Further, a common IP address is added to the service channels. Using this IP address, for example, the components, the SCS, and the like can be packaged for one or more service channels.

Note that in the digital broadcasting in the IP transmission system, an RF channel ID (hereinafter, referred to also as "RFchannelId") is assigned to a broadcast wave (RF Channel) having a predetermined frequency band, and a BBP stream ID (hereinafter, referred to also as "bbpStreamId") is assigned to the BBP stream. In addition, a service ID (hereinafter, referred to also as "serviceId") is assigned to one or more services included in each stream. It should be noted that where the service corresponds to the Service Channel shown in FIG. 1.

As described above, a configuration corresponding to a combination of network ID, transport stream ID, and service ID used in the MPEG2-TS system (hereinafter, referred to as "triplet") is employed as the ID system of the digital broadcasting in the IP transmission system. This triplet indicates a BBP stream configuration and a service configuration in a broadcasting network.

Accordingly, compatibility with the currently widely spread MPEG2-TS system can be achieved, and hence it is possible to easily perform simulcast during transition from the MPEG2-TS system to the IP transmission system, for example. It should be noted that in the ID system of the IP transmission system, e RF channel ID and the BBP stream ID are used instead of the network ID and the transport stream ID, respectively.

(Protocol Stack)

Figure 2:
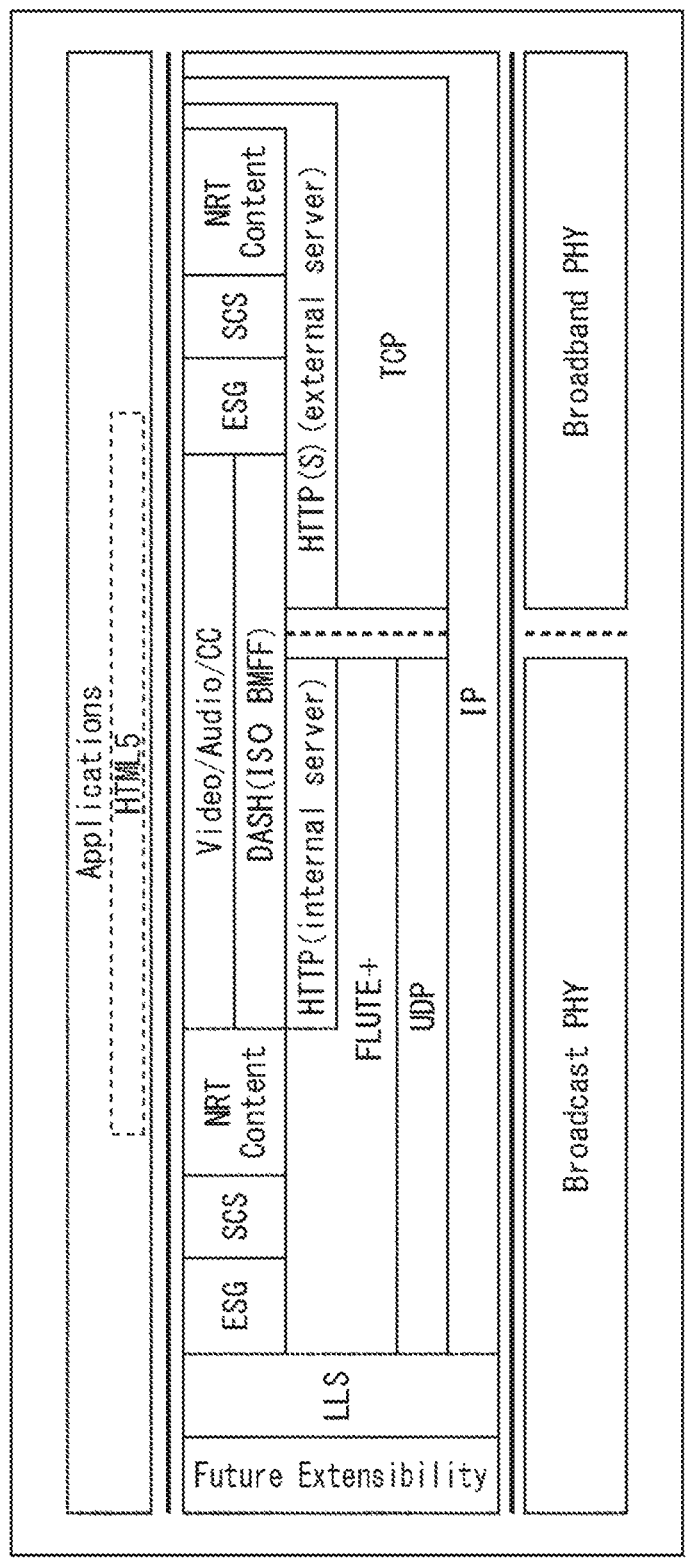
FIG. 2 A diagram showing a protocol stack of the digital broadcasting in the IP transmission system.

FIG. 2 is a diagram showing a protocol stack of the digital broadcasting in the IP transmission system.

As shown in FIG. 2, a lowest layer is a physical layer. In the digital broadcasting in the IP transmission system, data is not necessarily transmitted by broadcasting and a part of data is transmitted by communication in some cases. In the case where data is transmitted by broadcasting, the frequency band of broadcast waves assigned for a service (channel) corresponds to the physical layer (Broadcast PHY).

An upper layer of the physical layer is an IP layer. The IP layer corresponds to an IP (Internet Protocol) in the TCP/IP protocol stack. IP packets are identified by IP addresses. An upper layer adjacent to the IP layer is a UDP layer. In a further upper layer, FLUTE+ is shown. Thus, in the digital broadcasting in the IP transmission system, packets in which an IP address and a port number of a UDP (User Datagram Protocol) are specified are transmitted and a FLUTE (File Delivery over Unidirectional Transport) session is established.

Note that FLUTE+ represents extended FLUTE, which has been defined in the past. The detail of the FLUTE is defined in RFC6726. Further, FLUTE+ (plus) is in some cases called "FLUTE enhancement." In the FLUTE session, files to be transmitted or the like are managed by a TOI (Transport Object Identifier) as one object. Further, the aggregate of a plurality of objects is managed by a TSI (Transport Session Identifier) as one session. That is, in the FLUTE session, it is possible to specify a particular file by two identification information items of the TSI and the TOI.

In a part of upper layers adjacent to the FLUTE, ESG (Electronic Service Guide), SCS (Service Channel Signaling), and NRT content are shown. The ESG, SCS, and NRT content are transmitted through the FLUTE session. The NRT content is content transmitted by NRT (Non-Real Time) broadcasting, stored in storage of a receiver, and then reproduced. Note that the NRT content is an example of the content and other content files may be transmitted through the FLUTE session.

As the SCS, for example, USBD (User Service Bundle Description), MPD (Media Presentation Description), SDP (Session Description Protocol), and SPD (Service Parameter Description) are transmitted.

The USBD includes, for example, information for referring to the MPD and SDP. The MPD includes information such as a segment URL (Uniform Resource Locator) for each component transmitted in units of services. The SDP includes, for example, location information of the component. The SPD includes various parameters defined at the service level and the component level. Note that the USBD, MPD, SDP, and SPD are described with a markup language such as XML (Extensible Markup Language).

In another layer other than the above-described layers out of the upper layers adjacent to the FLUTE, HTTP (internal server) is shown. In an upper layer adjacent to the HTTP, DASH (ISO BMFF) is shown. Further, in an upper layer adjacent to the DASH (ISO BMFF), components such as video data, audio data, and closed caption data are shown. That is, the components such as video, audio, and closed caption are transmitted under the FLUTE session in units of media segments complying with the ISO Base Media File Format standard.

The LLS (Low Layer Signaling) is low layer signaling data, and is transmitted in the BBP stream. For example, as the LLS, SCD (Service Configuration Description), RRD (Region Rating Description), and EAD (Emergency Alerting Description) are transmitted.

The SCD employs the ID system corresponding to the triplet used in the MPEG2-TS system. This triplet indicates the BBP stream configuration and the service configuration in the broadcasting network. The SCD further includes information on an IP address and the like serving as attribute/setting information in units of services, ESG bootstrap information for accessing the ESG, and SCS bootstrap information for accessing the SCS.

The RRD includes rating information. The EAD includes information relating to emergency notice. Note that the SCD, RRD, and EAD are described with a markup language such as XML.

In the case where communication is used, an upper layer of the physical layer (Broadband PHY) is an IP layer. Further, an upper layer adjacent to the IP layer is a TCP layer, and an upper layer adjacent to the TCP layer is an HTTP(S) (external server) layer. That is, a protocol stack run in a network such as the Internet is implemented with these layers.

Accordingly, the receiver is capable of communicating with a server on the Internet with the TCP/IP protocol, and receiving ESG, SCS, and NRT content, for example. Further, the receiver is capable of receiving components such as video and audio adaptively streamed and delivered from the server on the Internet. Note that this streaming delivery conforms to the MPEG-DASH (Dynamic Adaptive Streaming over HTTP) standard.

It is possible to use the FLUTE session of broadcasting or TCP/IP protocol of communication to transmit applications. These applications can be described with a markup language such as HTML5 (HyperText Markup Language 5).

Since the digital broadcasting in the IP transmission system employs the above-mentioned protocol stack, it is possible to use the common protocol for layers other than the physical layer being lower than the IP layer (and the data link layer), i.e., the upper layers of the IP layer in the case where signaling data such as ESG and SCS is transmitted even by either broadcasting or communication. Therefore, in the receiver or the like, it is expected to reduce the burden on implementation or processing.

2. STRUCTURE OF PACKET (Structure of Packet)

Figure 3:
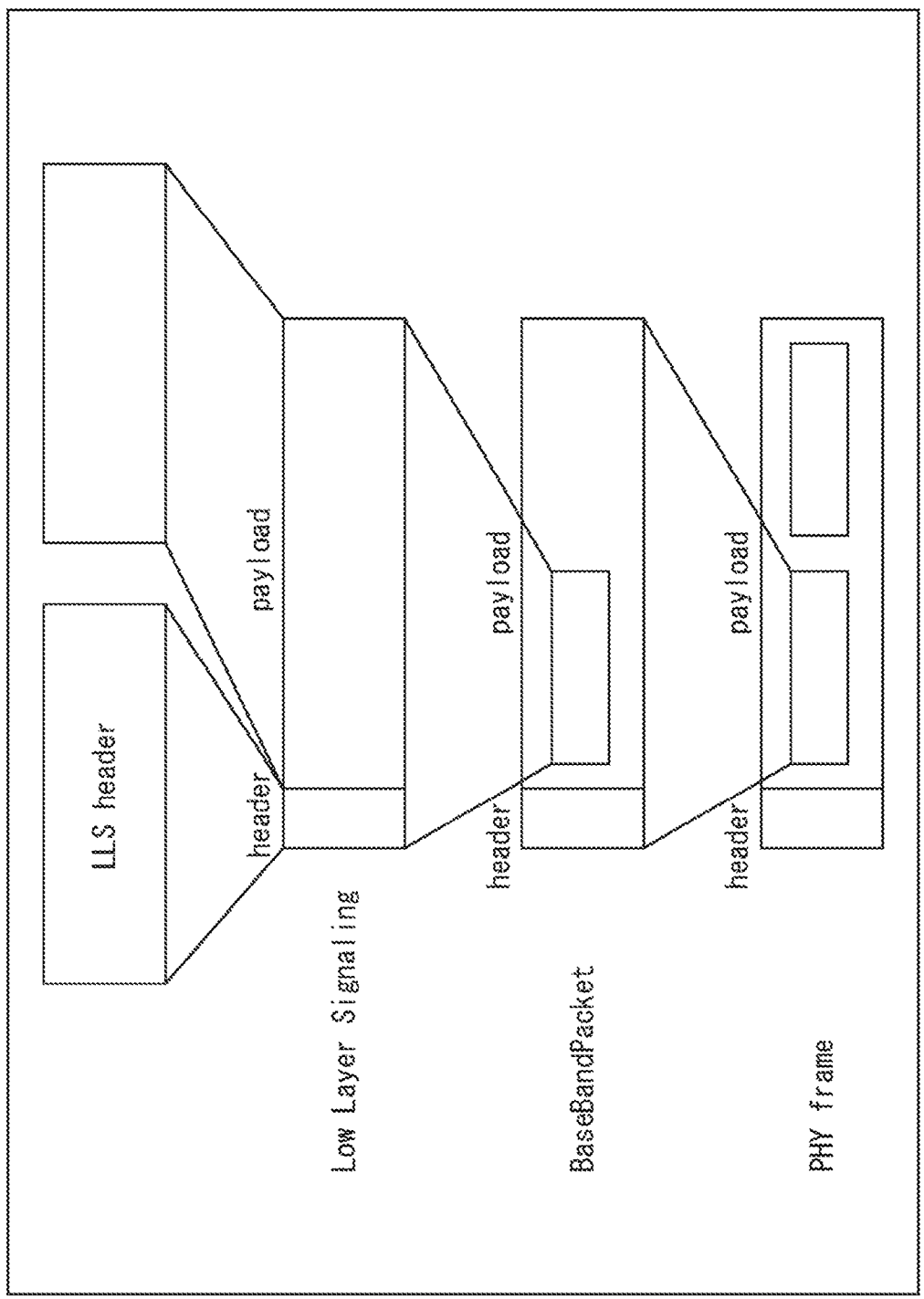
FIG. 3 A diagram showing a structure of a packet transmitted via the broadcast wave of the digital broadcasting in the IP transmission system.

FIG. 3 is a diagram showing a structure of a packet transmitted via the broadcast wave of the digital broadcasting in the IP transmission system. Note that the structure of the packet shown in FIG. 3 corresponds to a part of layers on the side of broadcasting of the protocol stack shown in FIG. 2.

That is, the physical frame (PHY frame) corresponds to the frame structure in the physical layer (Broadcast PHY) shown in FIG. 2. The BBP packet (Base Band Packet) corresponds to the structure of the packet transmitted in the BBP stream (Base Band Packet Stream) located between the physical layer (Broadcast PHY) and the IP layer shown in FIG. 2. Further, the LLS (Low Layer Signaling) corresponds to the LLS shown in FIG. 2.

As shown in FIG. 3, the physical frame includes a physical header and a payload. The payload of the physical frame includes a plurality of BBP packets. The packets each include a BBP header and a payload. The payload of the BBP packet includes an LLS packet. That is, in the case where the LLS packet is transmitted in the BBP stream, the part corresponding to the payload is the LLS packet. The LLS packet includes an LLS header and a payload.

Note that although not shown, in the case where the IP packet is transmitted in the BBP stream, the part corresponding to the payload is the IP packet. The IP packet includes an IP header and a payload. The payload of the IP packet includes a UDP packet. The UDP packet includes a UDP header and a payload. The payload of the UDP packet includes an LCT (Layered Coding Transport) packet. The LCT packet includes an LCT header and a payload.

Next, the detailed structure of the LLS header added to the LLS packet shown in FIG. 3 will be described with reference to FIGS. 4 to 8.

(Structure of LLS Header)

Figure 4:
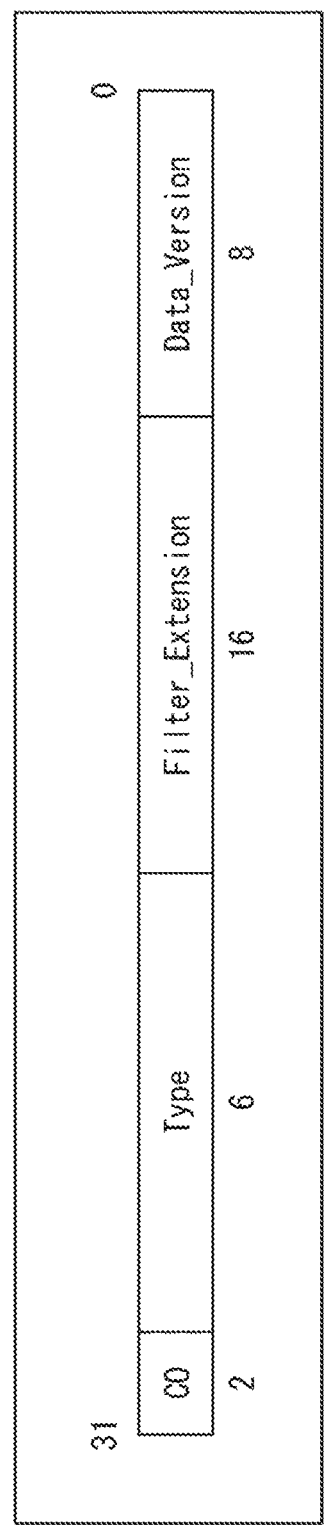
FIG. 4 A diagram showing a structure of an LLS header.

FIG. 4 is a diagram showing the structure of the LLS header. Note that elements constituting the LLS header shown in FIG. 4 are described in FIG. 5. A description will be made with reference to FIG. 5 appropriately.

As shown in FIG. 4, in the LLS header of 32 bits, "CO," "Type," "Filter_Extension," and "Data_Version" are provided as the filtering information.

The 2 bits of "CO" provided in the front position is the abbreviation of Compress, and is the compression information representing whether or not the target signaling data is compressed. For example, as shown in FIG. 6, "0" is specified in the "CO" in the case where the target signaling data is not compressed. In the case where the file of the target LLS is compressed in a zip format, "1" is specified. Alternatively, the file of the target LLS is compressed in the BiM (Binary format for MPEG-7 data), "2" is specified. Note that "3" is reserved for extension in the future.

Returning to FIG. 4, the 6 bits of "Type" provided next to the "CO" is the type information representing the type of the signaling data (LLS). For example, in the case of all LLSs (SCD, RRD, and EAD) as shown in FIG. 7, "0" is specified in the "Type." Similarly, in the "Type," values depending on the type of the LLS are specified, and "1," "2," and "3" are specified in the SCD, RRD, and EAD, respectively. Note that "4" to "63" are reserved for extension in the future.

Returning to FIG. 4, 16 bits of "Filter_Extension" provided next to the "Type" is the extended filter information representing the extended filtering information set for each type of the signaling data. It is possible to arbitrarily set this extended filter information.

For example, as shown in FIG. 8, a zip code and priority are respectively assigned to upper 5 bits and the subsequent 2 bits of 16 bits of Filter_Extension in the case where "3" is specified in the Type (EAD). For example, since 5 digits of zip code is used in the United States of America, it is possible to specify a particular region by assigning a value depending on the zip code to upper 5 bits. Note that the zip code of the United States of America has been described here as an example, the number of digits of zip code is different for countries or regions. Therefore, the bit is assigned corresponding to the number of digits. On the other hand, 4 stages of priority of "0" to "3" are specified as the priority, for example. This example represents that the higher the value is, the higher the priority is.

Although the EAD includes information relating to emergency notice as described above, it is not necessarily necessary information for all users depending on the target region or the degree of emergency. In view of the above, only necessary information is acquired by extending the filtering information with the extended filter information and specifying it.

As shown in FIG. 8, for example, it is possible to define arbitrary bits of filter ID (Fi_id) and arbitrary bits of filter value in 16 bits of Filter_Extension. That is, since the content of the filter value is defined for each filter ID, it is possible to define various kinds of extended filter information.

Returning to FIG. 4, 8 bits of "Data_Version" provided next to the "Filter_Extension" is the version information representing the version of the target signaling data.

Note that it is not necessarily need to provide all of the compression information (CO), the type information (Type), the extended filter information (Filter_Extension), and the version information (Data_Version) as the filtering information, and it only has to provide at least one piece of information out of these information items depending on the filtering condition. The compression information (CO), the type information (Type), the extended filter information (Filter_Extension), and the version information (Data_Version) are only examples of the filtering information. Another parameter may be defined as long as it can be used for the filtering processing on the signaling data.

As described above, in the LLS header, the filtering information including the compression information (CO), the type information (Type), the extended filter information (Filter_Extension), and the version information (Data_Version) is defined. Accordingly, the receiver is capable of acquiring the target signaling data by using the filtering information in the LLS header to perform the filtering processing on the LLS packet.

3. APPLICATION EXAMPLE

Next, a specific application example will be described with reference to FIGS. 9 and 10.

(1) Application Example 1

Figure 9:
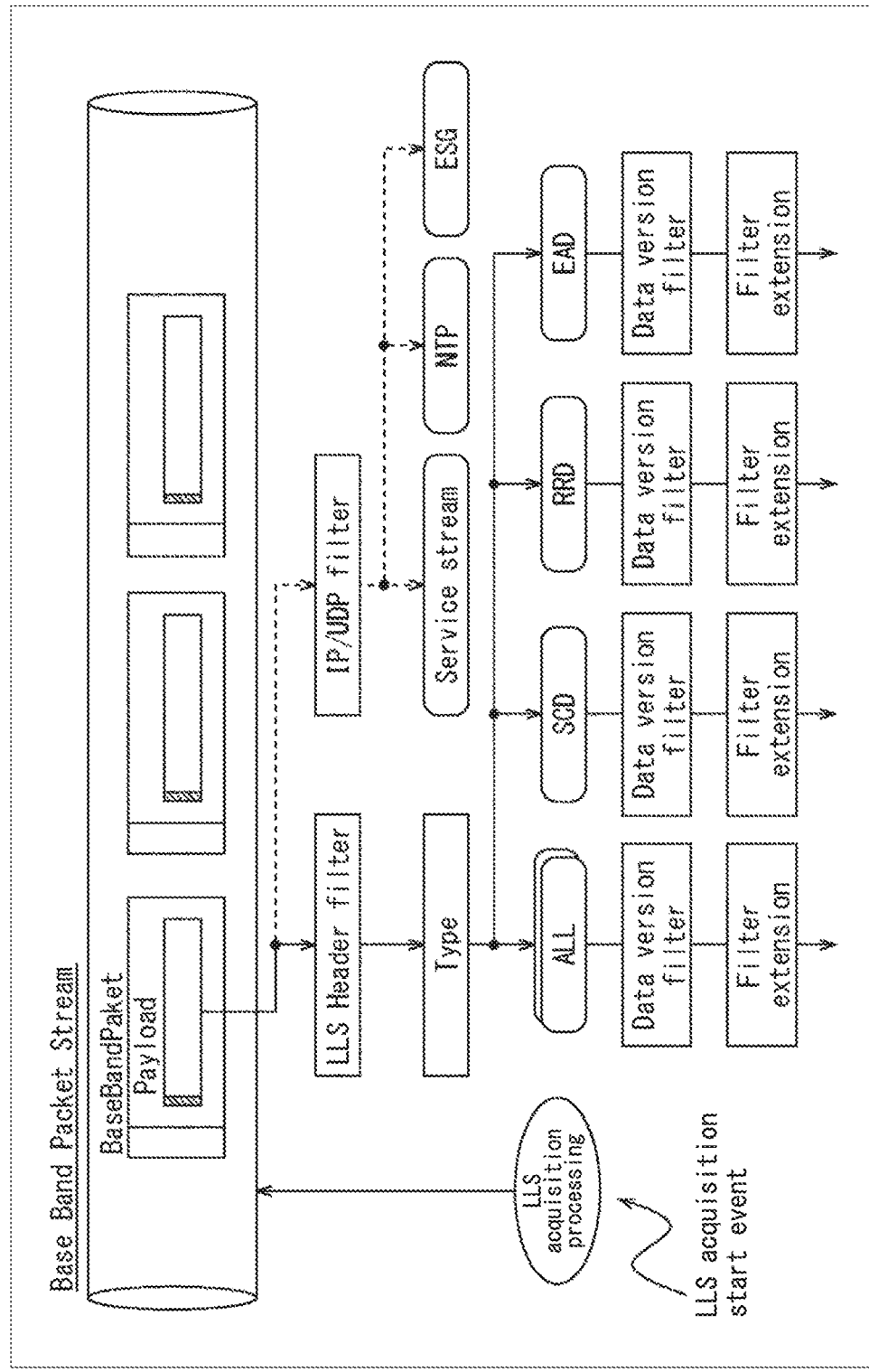
FIG. 9 A diagram for explaining filtering processing for acquiring a file of a particular LLS.

FIG. 9 is a diagram for explaining filtering processing for acquiring a file of a particular LLS.

In FIG. 9, a transmitter of a broadcasting station (broadcaster) transmits, via a broadcast wave of the digital broadcasting using the IP transmission system, the BBP stream. It should be noted that in the digital broadcasting, the above-mentioned ID system is employed. Further, in the LLS header of the LLS packet, the type information (Type), the extended filter information (Filter_Extension), and the version information (Data_Version) are provided as the filtering information. Files of the component, SCS, and ESG are transmitted through the FLUTE session.

As shown in FIG. 9, the receiver placed in each house or the like starts the LLS acquisition processing in the case where the LLS acquisition start event occurs. The receiver performs filtering processing with the LLS header of the LLS packet included in the payload of the BBP packet, which is transmitted in the BBP stream.

In the LLS header of the LLS packet, the type information (Type) is provided. With the type information, it is possible to recognize the type of the LLS. Specifically, because the SCD, RRD, and EAD are transmitted as the LLS, the LLS packets of all LLSs (SCD, RRD, and EAD) are extracted by performing filtering processing on the LLS packet under the filtering condition of Type="0."

By specifying the version information (Data_Version) in the filtering condition, the versions of the LLSs are compared with each other through filtering processing using the filtering condition. Thus, only the updated LLS is acquired. Further, by specifying the extended filter information (Filter_Extension) in the filtering condition, only a particular LLS is acquired through filtering processing using the filtering condition.

Similarly, in the case where filtering processing is performed on the LLS packet under the filtering condition of Type="1," only the LLS packet of the SCD is extracted. Further, by specifying the version information (Data_Version) or the extended filter information (Filter_Extension) in the filtering condition and performing the filtering processing, only a particular SCD is acquired.

Similarly, in the case where filtering processing is performed on the LLS packet under the filtering condition of Type="2," only the LLS packet of the RRD is extracted. Further, by specifying the version information (Data_Version) or the extended filter information (Filter_Extension) in the filtering condition and performing the filtering processing, only a particular RRD is acquired.

Similarly, in the case where filtering processing is performed on the LLS packet under the filtering condition of Type="3," only the LLS packet of the EAD is extracted. Further, by specifying the version information (Data_Version) or the extended filter information (Filter_Extension) in the filtering condition and performing the filtering processing, only a particular EAD is acquired.

Note that the receiver performs filtering processing with the IP header and the UDP header when the SCD or SCS is acquired, and is capable of acquiring the component, NTP, ESG, and the like by extracting the packet of the target service that satisfies the filtering condition of the IP address and port number.

As described above, in the application example 1, it is possible to use, for example, the type information (Type), the version information (Data_Version), and the extended filter information (Filter_Extension) provided in the LLS header to acquire only the file of a particular LLS that satisfies the filtering condition from the LLSs. Therefore, the receiver is capable of efficiently acquiring only necessary information at the optimal timing.

(2) Application Example 2

Figure 10:
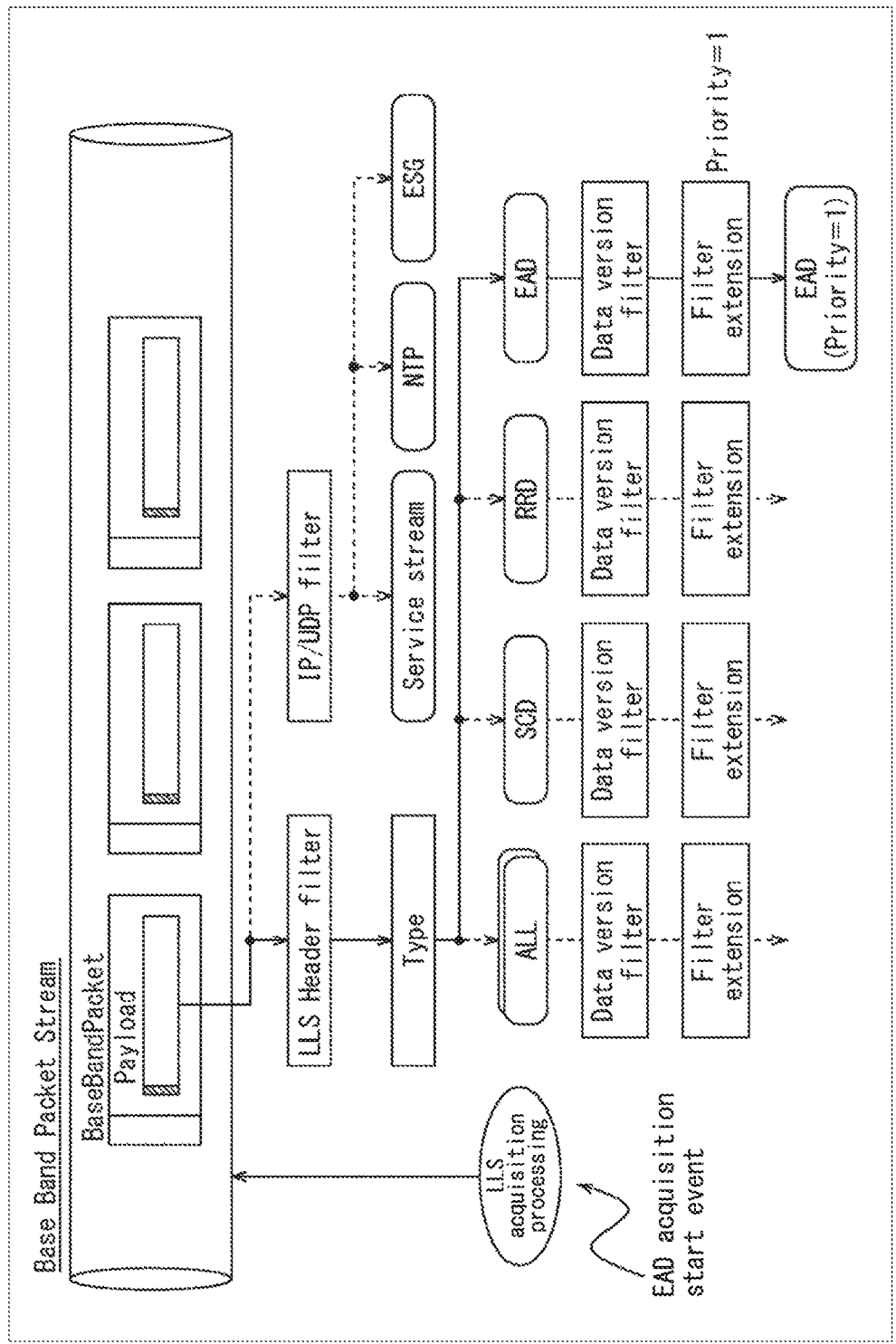
FIG. 10 A diagram for explaining filtering processing for acquiring a file of a particular EAD.

FIG. 10 is a diagram for explaining filtering processing for acquiring a file of a particular EAD.

In FIG. 10, a transmitter of a broadcasting station (broadcaster) transmits, via a broadcast wave of the digital broadcasting using the IP transmission system, the BBP stream. It should be noted that in the digital broadcasting, the above-mentioned ID system is employed. Further, in the LLS header of the LLS packet, the type information (Type), the extended filter information (Filter_Extension), and the version information (Data_Version) are provided as the filtering information. Files of the component, SCS, and ESG are transmitted through the FLUTE session.

As shown in FIG. 10, the receiver placed in each house or the like starts the LLS acquisition processing in the case where the EAD acquisition start event occurs. The receiver performs filtering processing with the LLS header of the LLS packet included in the payload of the BBP packet, which is transmitted in the BBP stream.

In the LLS header of the LLS packet, the type information (Type) is provided. With the type information, it is possible to recognize the type of the LLS. In this application example 2, the file of the EAD is acquired. Therefore, only the LLS packet of the EAD is extracted by performing filtering processing on the LLS packet under the filtering condition of Type="3."

By specifying the version information (Data_Version) or the extended filter information (Filter_Extension) in the filtering condition and performing the filtering processing, it is possible to acquire only a particular EAD. Priority="1" is set as the extended filter information (Filter_Extension) in this example, only the EAD having the priority of "1" is acquired. Note that although the case where priority is specified as the extended filter information (Filter_Extension) has been described in FIG. 10, only the EAD in a particular area may be acquired by specifying a zip code as shown in FIG. 8, for example.

As described above, in the application example 2, it is possible to acquire only the file of a particular EAD that satisfies the filtering condition from the LLSs by using, for example, the type information (Type), the version information (Data_Version), and the extended filter information (Filter_Extension) provided in the LLS header. Therefore, in the case where the EAD acquisition start event occurs, the receiver is capable of efficiently acquiring only necessary information.

That is, although the EAD includes information relating to emergency notice, it is not necessarily necessary information for all users depending on the target region or the degree of emergency. In view of the above, only necessary information can be acquired by specifying the filtering condition with the extended filter information.

4. DATA STRUCTURE OF LLS

(1) Syntax of SCD

FIG. 11 is a diagram showing an example of a syntax of the SCD.

The SCD is described with a markup language such as XML. Note that, in FIG. 11, "@" is added to the attribute out of the element and the attribute. Further, the indented elements and attributes are those specified with respect to upper-level elements thereof. The same relationship between them applies to other syntaxes to be described later As shown in FIG. 11, the Scd element is an upper-level element of majorProtocolversion attribute, minorProtocolversion attribute, RFchannelId attribute, name attribute, Tuning_RF element, and BBPStream element.

In the majorProtocolversion attribute and the minorProtocolversion attribute, protocol version information is specified. In the RFchannelId attribute, an RF channel ID of a broadcasting station in units of physical channels is specified. In the name attribute, the name of the broadcasting station in units of physical channels is specified.

In the Tuning_RF element, information relating to the channel selection is specified. The Tuning_RF element is an upper-level element of frequency attribute and PreambleL1Pre attribute. In the frequency attribute, a frequency in selecting a predetermined bandwidth is specified. In the PreambleL1Pre attribute, control information of a physical layer is specified.

In the BBPStream element, information relating to one or more BBP streams is specified. The BBPStream element is an upper-level element of bbpStreamId attribute, payloadType attribute, name attribute, ESGBootstrap element, ClockReferenceInformation element, Tuning_BBPS element, and Service element.

In the bbpStreamId attribute, a BBP stream ID is specified. If a plurality of BBP streams are provided, they are identified by bbpStreamId attributes. In the payloadType attribute, a payload type of the BBP stream is specified. For example, "ipv4," "ipv6," or "ts" is specified as this payload type. "Ipv4" indicates IPv4 (Internet Protocol version 4). "Ipv6" indicates IPv6 (Internet Protocol Version 6). "Ts" indicates a TS (Transport Stream). In the name attribute, the name of the BBP stream is specified.

In the ESGBootstrap element, information on access to the ESG is specified. The ESGBootstrap element is an upper-level element of an ESGProvider element. In the ESGProvider element, information relating to the ESG is specified for each ESG provider. The ESGProvider element is an upper-level element of providerName attribute, ESGBroadcastLocation element, and ESGBroadbandLocation element.

In the providerName attribute, the name of the ESG provider is specified. If an ESG is transmitted by broadcasting, the ESGBroadcastLocation element specifies an ESG service, using RFchannelId attribute, BBPStreamId attribute, and ESGServiceId attribute (triplet). In the RFchannelId attribute, an RF channel ID of a broadcasting station that transmits the ESG service is specified. In the BBPStreamId attribute, a BBP stream ID of a BBP stream that transmits the ESG service is specified. In the ESGServiceId attribute, a service ID of the ESG service is specified.

If an ESG is transmitted by communication, the ESGBroadbandLocation element specifies a URL for accessing a file of that ESG, using an ESGurl attribute.

In the ClockReferenceInformation element, information relating to time information (e.g., NTP) is specified. The ClockReferenceInformation element is an upper-level element of sourceIPAddress attribute, destinationIPAddress attribute, portNum attribute, and clockReferenceFormat attribute.

In the sourceIPAddress attribute and the destinationIPAddress attribute, IP addresses of source and destination for transmitting the time information are specified. In the portNum attribute, a port number for transmitting the time information is specified. In the clockReferenceFormat attribute, type information of the time information is specified. For example, "NTPnormal" or "NTP27M" is specified as this type information. "NTPnormal" indicates a normal NTP. Further, "NTP27M" indicates adaptability for a reference clock of 27 MHz of a PCR (Program Clock Reference).

In the Tuning_BBPS element, the information relating to the channel selection for each BBP stream is specified. The Tuning_BBPS element is an upper-level element of plpId attribute and PreambleL1post element. In the plpId attribute, a PLP ID for identifying the BBP stream is specified. Note that the PLP ID corresponds to the BBP stream ID. In the PreambleL1post element, control information of the physical layer is specified.

In the Service element, information relating to one or more services is specified. The Service element is an upper-level element of serviceId attribute, serviceType attribute, hidden attribute, hiddenGuide attribute, shortName attribute, longName attribute, accesControl attribute, SourceOrigin element, SCSbootstrap element, and Associated Service element.

In the serviceId attribute, the service ID is specified. If a plurality of services are provided, they are identified by serviceId attributes. In the serviceType attribute, type information of the service is specified. For example, "continuous," "scripted," or "esg" is specified as this type information. "Continuous" indicates a video/audio service. "Scripted" indicates an NRT service. "Esg" indicates an ESG service.

In the hidden attribute and the hiddenGuide attribute, whether or not the service identified by the service ID is a hidden service is specified. If "on" is specified as those attribute values, that service is set not to be displayed. Further, if "off" is specified as those attribute values, that service is displayed. For example, if "on" is specified as the hidden attribute, that service is set not to be selected by an operation of a remote controller. Further, for example, if "on" is specified as the hiddenGuide attribute, that service is set not to be displayed in the ESG.

In the shortName attribute and the longName attribute, the name of service identified by the service ID is specified. It should be noted that, in the shortName attribute, the name of the name of the service has to be specified with at most seven letters. In the accesControl attribute, whether or not the service identified by the service ID has been encrypted is specified. If "on" is specified as the accesControl attribute, it indicates that that service has been encrypted and, if "off" is specified, it indicates that that service has not been encrypted.

In the SourceOrigin element, information for identifying the service is specified. The SourceOrigin element is an upper-level element of country attribute, originalRFchannelId attribute, bbpStreamId attribute, and serviceId attribute. In the country attribute, a country code is specified. In the originalRFchannelId attribute, an original RF channel ID is specified. The original RF channel ID is an ID for identifying the broadcasting network and the same value is used therefor also when that service is re-transmitted. In the bbpStreamId attribute, the BBP stream ID is specified. In the serviceId attribute, the service ID is specified. That is, using the country code, original RF channel ID, BBP stream ID, and service ID, a specific ID can be assigned to each service.

In an SCSBootstrap element, information on access to the service is specified. The SCSBootstrap element is an upper-level element of sourceIPAddress attribute, destinationIPAddress attribute, portNum attribute, and tsi attribute. In the sourceIPAddress attribute and the destinationIPAddress attribute, IP addresses of source and destination for transmitting the service are specified. In the portNum attribute, the port number for transmitting the SCS is specified. In the tsi attribute, the TSI in the FLUTE session that transmits the SCS is specified.

In the Associated Service element, information relating to an associated slave service is specified. The AssociatedService element is an upper-level element of RFchannelId attribute, bbpStreamId attribute, and serviceId attribute. In the RFchannelId attribute, an RF channel ID of the associated slave service is specified. In the bbpStreamId attribute, a BBP stream ID of the associated slave service is specified. In the serviceId attribute, a service ID of the associated slave service is specified.

Note that in FIG. 11, regarding cardinality, when "1" is specified, only one element or attribute is necessarily specified. When "0 . . . 1" is specified, it is optional whether to specify an element or attribute. When "1 . . . n" is specified, one or more elements or attributes are specified. When "0 . . . n" is specified, it is optional whether to specify one or more elements or attributes. The same meanings of the cardinality as described above apply to other syntaxes to be described later.

(2) Syntax of RRD

FIG. 12 is a diagram showing an example of a syntax of an RRD. The RRD is described with a markup language such as XML.

As shown in FIG. 12, the RRD element is an upper-level element of RatingRegionName element, RatingRegion element, TableVersion element, and Dimension element. In the RatingRegionName element, the name of a rating region is specified. As this name, "us," "canada," and "mexico" are specified, for example. In the RatingRegion element, the code of a rating region is specified. In the TableVersion element, the version information of the RRD is specified.

The Dimension element is an upper-level element of RatingDimensionName element, RatingDimension element, GraduatedScale element, and DimensionValue element. In the RatingDimensionName element, the name of a rating dimension is specified. In the RatingDimension element, the code of a rating dimension is specified. In the GraduatedScale element, a scale is specified.

In the DimensionValue element, the value of a dimension is specified. The DimensionValue element is an upper-level element of RatingValueText element, AbbrevValueText element, RatingValue element, and RatingTag element. Rating information, for example, how to set the age limit is specified by those attributes.

(2) Syntax of EAD

FIG. 13 is a diagram showing an example of a syntax of an EAD. The EAD is described with a markup language such as XML.

As shown in FIG. 13, the EAD element is an upper-level element of AutomaticTuningService element and EAMessage element. The AutomaticTuningService element is for specifying an automatically selecting channel service at the time of wake-up. The AutomaticTuningService element is an upper-level element of RFchannelId attribute, bbpStreamId attribute, and serviceId attribute.

In the RFchannelId attribute, the RF channel ID of an automatically selecting channel service is specified. In the bbpStreamId attribute, the BBP stream ID of the automatically selecting channel service is specified. In the serviceId attribute, the service ID of the automatically selecting channel service is specified. That is, if the AutomaticTuningService element appears, the service specified by the triplet represented by these attributes is selected. It should be noted that the triplet does not necessarily include the RFchannelId attribute and the bbpStreamId attribute. For example, in the case where the same BBP stream as that of the EAD is specified, it only has to specify only the serviceId attribute.

In the EAMessage element, a message of emergency notice information (emergency information) is specified. The EAMessage element is an upper-level element of eaMessageId attribute, eaPriority attribute, EAMessageData element, EAApplication element, EAService element, and EAWww element.

In the eaMessageId attribute, the ID of the emergency notice information (emergency information) is specified. In the eaPriority attribute, the priority of the emergency notice information (emergency information) is specified. In the EAMessageData element, closed captioning information of the emergency notice information (emergency information) is specified.

In the EAApplication element, information relating to an application for emergency notice is specified. The EAApplication element is an upper-level element of applicationId attribute. In the applicationId attribute, an application ID is specified.

In the EAService element, information relating to an NRT service for emergency notice is specified. The EAService element is an upper-level element of serviceId attribute and serviceType attribute. In the serviceId attribute, a service ID is specified. In the serviceType attribute, service type information is specified. As this service type information, "nrt" and "adjunct_shared" are specified. The "nrt" represents that it is an NRT service. The "adjunct_shared" (shared) represents that it is a shared service.

In the EAWww element, information relating to an emergency information site is specified. The EAWww element is an upper-level element of uri attribute. In the uri attribute, the URL of the emergency information site is specified.

Note that the syntaxes of the SCD, RRD, and EAD described with reference to FIGS. 11 to 13 are merely examples, and it is possible to employ another syntax.

5. CONFIGURATION OF BROADCAST COMMUNICATION SYSTEM (Configuration Example of Broadcast Communication System)

Figure 14:
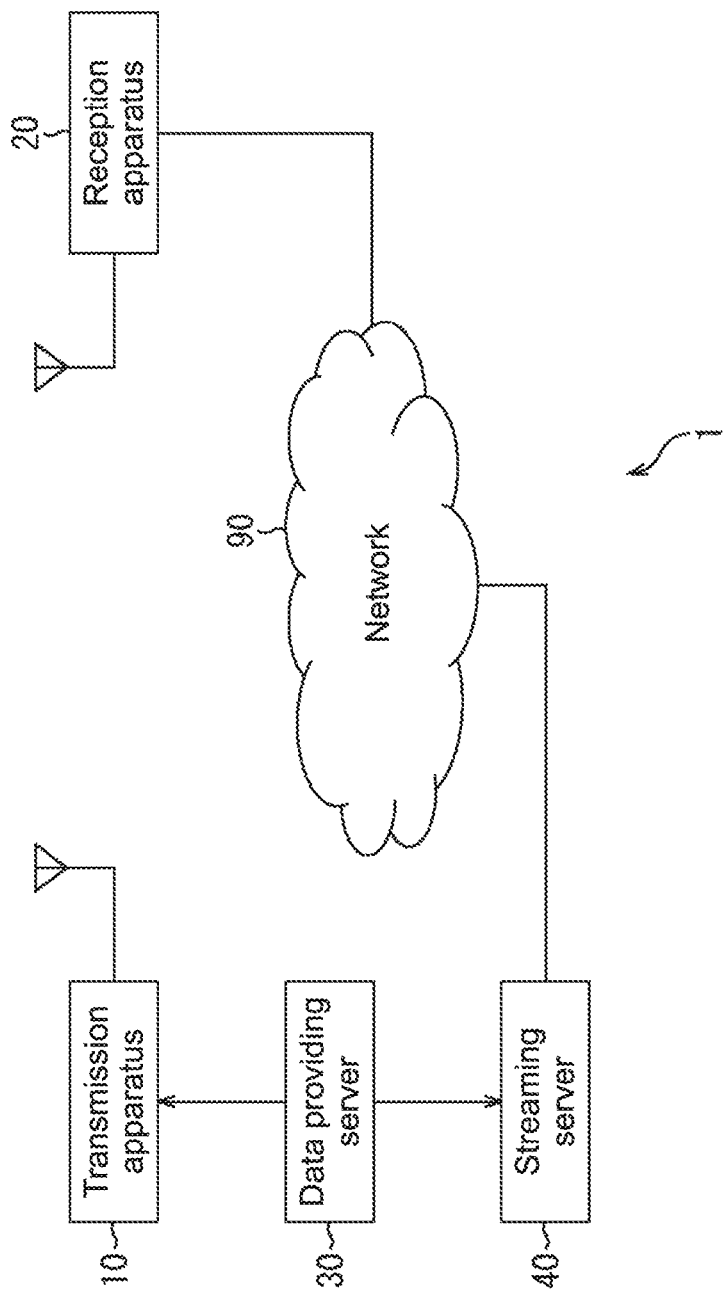
FIG. 14 A diagram showing a configuration of an embodiment of the broadcast communication system to which the present technology is applied.

FIG. 14 is a diagram showing a configuration of an embodiment of the broadcast communication system to which the present technology is applied.

In FIG. 14, a broadcast communication system 1 is a system for providing various services in cooperation with broadcasting and communication.

As shown in FIG. 14, the broadcast communication system 1 is constituted of a transmission apparatus 10, a reception apparatus 20, a data providing server 30, and a streaming server 40. In FIG. 14, the reception apparatus 20 and the streaming server 40 are connected to each other via a network 90.

The transmission apparatus 10 transmits a component provided from the data providing server 30 via a broadcast wave of the digital broadcasting using the IP transmission system. The transmission apparatus 10 uses original data of the signaling data provided from the data providing server 30 to generate the signaling data, and transmits it together with the component via a broadcast wave of the digital broadcasting using the IP transmission system. Note that the transmission apparatus 10 corresponds to the above-mentioned transmitter (e.g., FIG. 9 or FIG. 10), and is provided by a broadcaster, for example.

The reception apparatus 20 receives a broadcast wave of the digital broadcasting that is transmitted from the transmission apparatus 10, and acquires the signaling data transmitted by that broadcast wave of the digital broadcasting. On the basis of the signaling data acquired from the transmission apparatus 10, the reception apparatus 20 acquires the component transmitted via a broadcast wave of the digital broadcasting transmitted from the transmission apparatus 10. The reception apparatus 20 displays, on the basis of the component transmitted from the transmission apparatus 10, a picture on the display and outputs sound synchronized with that picture from the speaker.

Note that the reception apparatus 20 corresponds to the above-mentioned receiver (e.g., FIG. 9 or FIG. 10), and is placed in each house, for example. Further, the reception apparatus 20 may include a display or a speaker, and may be incorporated into a television receiver or a video recorder.

The data providing server 30 provides components such as video data and audio data to the transmission apparatus 10 and the streaming server 40. Further, the data providing server 30 provides original data of the signaling data to the transmission apparatus 10. Note that the data providing server 30 may provide, to the transmission apparatus 10, the signaling data instead of the original data of the signaling data.

The streaming server 40 streams and delivers, in response to a request from the reception apparatus 20, the component provided from the data providing server 30 as streams via the network 90. Note that the streaming server 40 is provided by, for example, a broadcaster.

On the basis of signaling data transmitted from the transmission apparatus 10, the reception apparatus 20 acquires the component streamed and delivered from the streaming server 40 via the network 90. The reception apparatus 20 displays, on the basis of the component transmitted from the streaming server 40, a picture on the display and outputs sound synchronized with that picture from the speaker.

The broadcast communication system 1 is configured as described above. Next, as the detailed configuration of apparatuses constituting the broadcast communication system 1 shown in FIG. 14, configurations of the transmission apparatus 10 and the reception apparatus 20 will be described with reference to FIGS. 15 and 16. Note that a description of detailed configurations of the data providing server 30 and the streaming server 40 will be omitted.

(Configuration Example of Transmission Apparatus)

Figure 15:
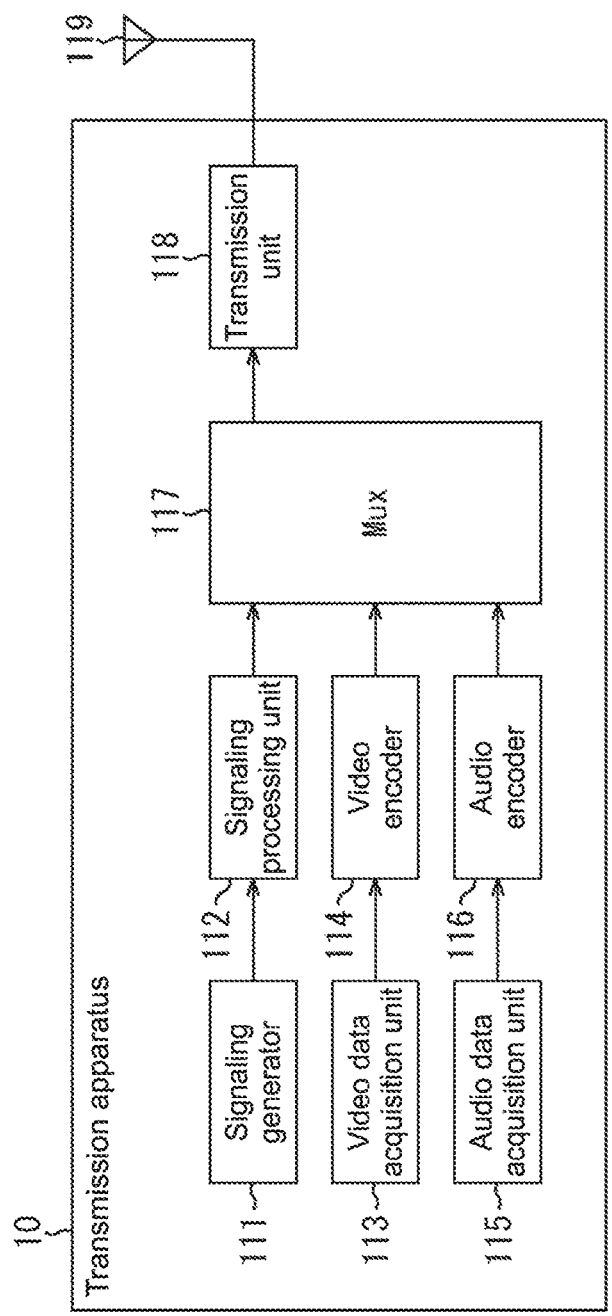
FIG. 15 A diagram showing a configuration of an embodiment of the transmission apparatus to which the present technology is applied.

FIG. 15 is a diagram showing a configuration of an embodiment of the transmission apparatus to which the present technology is applied.

As shown in FIG. 15, the transmission apparatus 10 is constituted of a signaling generator 111, a signaling processing unit 112, a video data acquisition unit 113, a video encoder 114, an audio data acquisition unit 115, an audio encoder 116, an Mux 117, a transmission unit 118.

The signaling generator 111 uses the original data of the signaling data provided from the data providing server 30 to generate the signaling data, and supplies it to the signaling processing unit 112. The signaling processing unit 112 processes the signaling data supplied from the signaling generator 111, and supplies it to the Mux 117.

As the signaling data, for example, the SCD, RRD, and EAD transmitted as the LLS, and USBD, MPD, SDP, and SPD transmitted as the SCS are generated.

The video data acquisition unit 113 acquires video data serving as a component from built-in storage, an external server, a camera, or the like, and supplies it to the video encoder 114. The video encoder 114 encodes the video data supplied from the video data acquisition unit 113 in compliance with the encoding method such as MPEG, and supplies it to the Mux 117.

The audio data acquisition unit 115 acquires audio data serving as a component from built-in storage, an external server, a microphone, or the like, and supplies it to the audio encoder 116. The audio encoder 116 encodes the audio data supplied from the audio data acquisition unit 115 in compliance with the encoding method such as MPEG, and supplies it to the Mux 117.

The Mux 117 multiplexes the signaling data supplied from the signaling processing unit 112, the video data supplied from the video encoder 114, and the audio data supplied from the audio encoder 116 to generate a BBP stream in the IP transmission system, and supplies it to the transmission unit 118.

The transmission unit 118 transmits, as the digital broadcasting signal, the BBP stream supplied from the Mux 117 via an antenna 119.

Note that in the digital broadcasting signal, the filtering information such as the compression information (CO), the type information (Type), the extended filter information (Filter_Extension), and the version information (Data_Version) is provided in the LLS header of the LLS packet in which the file data of SCD, RRD, and EAD transmitted as the LLS is stored.

(Configuration Example of Reception Apparatus)

Figure 16:
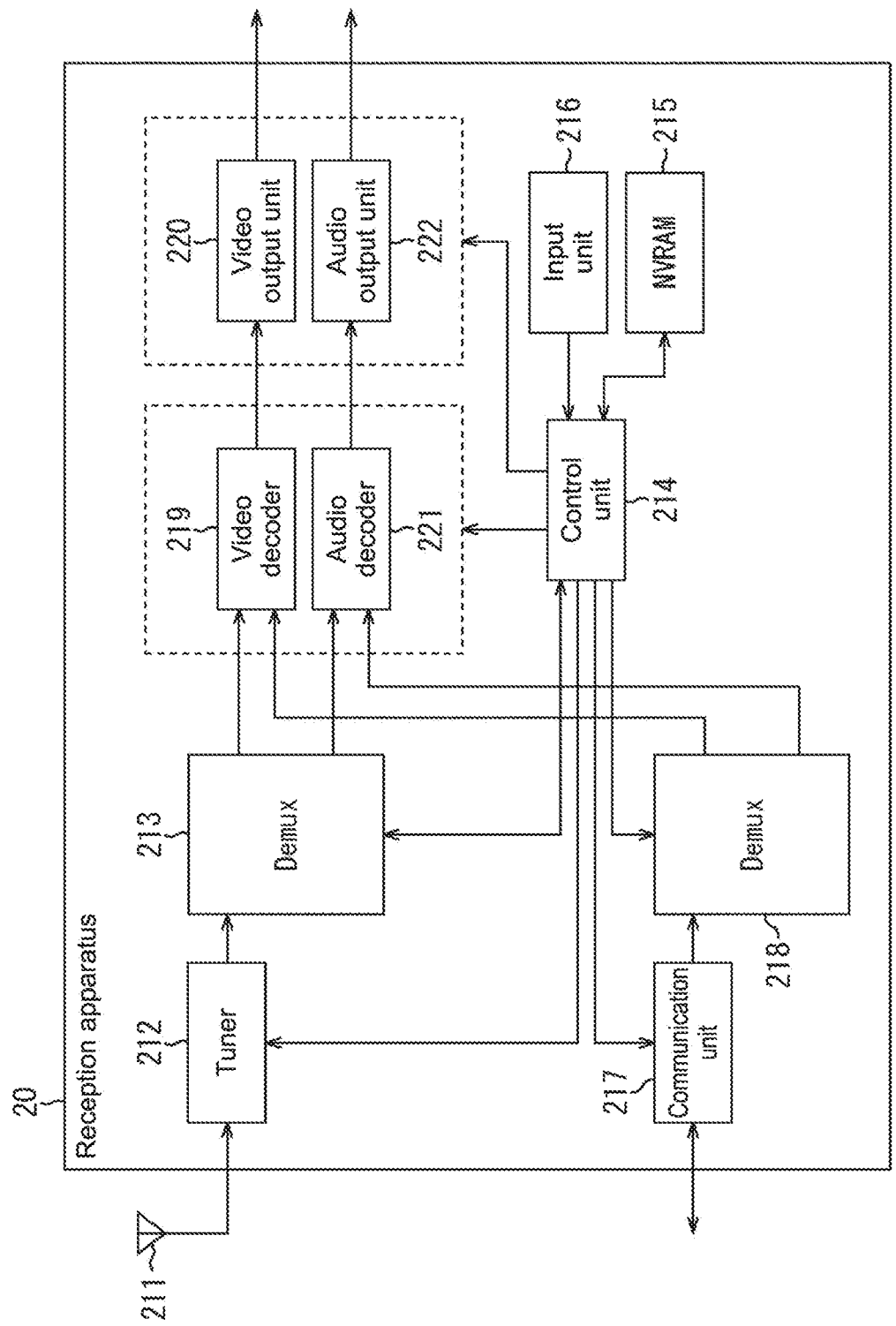
FIG. 16 A diagram showing a configuration of an embodiment of the reception apparatus to which the present technology is applied.

FIG. 16 is a diagram showing a configuration of an embodiment of the reception apparatus to which the present technology is applied.

As shown in FIG. 16, the reception apparatus 20 is constituted of a tuner 212, a Demux 213, a control unit 214, an NVRAM 215, an input unit 216, a communication unit 217, a Demux 218, a video decoder 219, a video output unit 220, an audio decoder 221, and an audio output unit 222.

Under the control of the control unit 214, the tuner 212 extracts, from a broadcast wave of the digital broadcasting signal using the IP transmission system received by the antenna 211, the digital broadcasting signal of a particular service, with respect to which a selection instruction has been made, demodulates it, and supplies the resulting BBP stream to the Demux 213.

Under the control of the control unit 214, the Demux 213 demultiplexes the BBP stream supplied from the tuner 212 into the video data, the audio data, and the signaling data, and supplies the video data to the video decoder 219 and the audio data to the audio decoder 221.

Under the control of the control unit 214, the Demux 213 performs filtering processing on the basis of the filtering information of the LLS header added to the LLS packet. In this filtering processing, filtering is performed under the filtering condition of at least one piece of information out of the compression information (CO), the type information (Type), the extended filter information (Filter_Extension), and the version information (Data_Version). The LLS acquired by the filtering processing is supplied as the signaling data together with the SCS to the control unit 214.

Note that in the case where the component or signaling data is transmitted through the FLUTE session, the Demux 213 acquires the video data, audio data, and signaling data by performing filtering processing using an IP address, port number, TSI, TOI, and the like, under the control of the control unit 214.

The control unit 214 controls operations of respective units of the reception apparatus 20. On the basis of the signaling data supplied from the Demux 213, the control unit 214 controls operations of respective units for acquiring the component transmitted by broadcasting.

The NVRAM 215 is a non-volatile memory, and stores, under the control of the control unit 214, various types of data. The input unit 216 supplies an operation signal to the control unit 214 in response to a user's operation. The control unit 214 controls operations of the respective units constituting the reception apparatus 20 in response to the operation signal supplied from the input unit 216.

Under the control of the control unit 214, the communication unit 217 requests, via the network 90, the streaming server 40 to deliver streams. The communication unit 217 receives streams streamed and delivered from the streaming server 40 via the network 90, and supplies them to the Demux 218.

Under the control of the control unit 214, the Demux 218 demultiplexes the streams supplied from the communication unit 217 into the video data and the audio data, and supplies the video data to the video decoder 219 and the audio data to the audio decoder 221. Note that in the case where the streams delivered from the streaming server 40 are only audio data, the Demux 218 does not demultiplex the components and supplies the audio data to the audio decoder 221.

Under the control of the control unit 214, the video decoder 219 decodes any one of the video data supplied from the Demux 213 and the video data supplied from the Demux 218 in compliance with the decoding method such as MPEG, and supplies it to the video output unit 220. The video output unit 220 outputs the video data supplied from the video decoder 219 to a display (not shown) at the subsequent stage. With this, a picture of a program, for example, is displayed on the display.

Under the control of the control unit 214, the audio decoder 221 decodes any one of the audio data supplied from the Demux 213 and the audio data supplied from the Demux 218 in compliance with the decoding method such as MPEG, and supplies it to the audio output unit 222. The audio output unit 222 outputs the audio data supplied from the audio decoder 221 to a speaker (not shown) at the subsequent stage. With this, sound corresponding to the picture of the program, for example, is output from the speaker.

Note that although a display and a speaker are provided outside in the configuration example of the reception apparatus 20 in FIG. 16, the reception apparatus 20 may include a display and a speaker.

6. SPECIFIC FLOWS OF PROCESSING EXECUTED BY APPARATUSES

Next, specific flows of processing executed by apparatuses constituting the broadcast communication system 1 in FIG. 14 will be described with reference to flowcharts shown in FIGS. 17 to 21.

(Transmission Processing)

Figure 17:
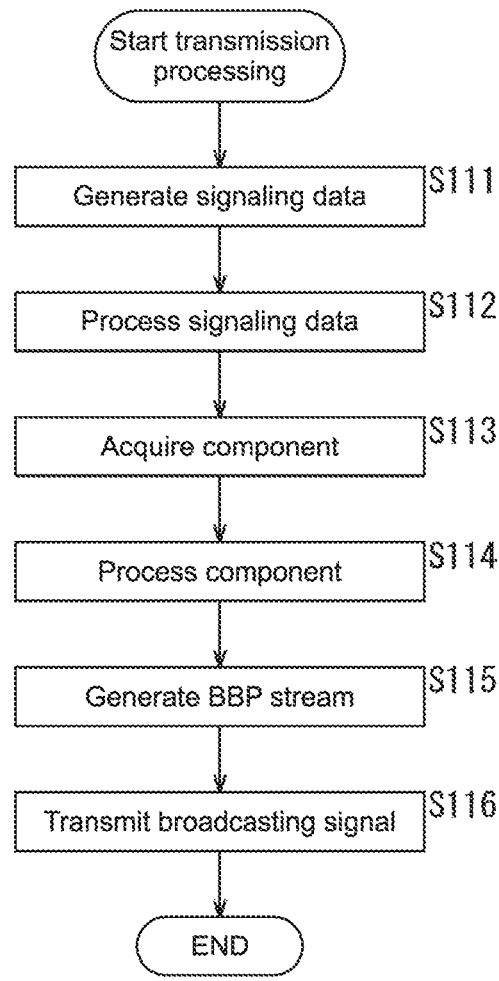
FIG. 17 A flowchart explaining transmission processing.

The transmission processing performed by the transmission apparatus 10 in FIG. 14 will be described first with reference to the flowchart shown in FIG. 17.

In Step S111, the signaling generator 111 uses the original data of the signaling data provided from the data providing server 30 to generate the signaling data, and supplies it to the signaling processing unit 112.

In Step S112, the signaling processing unit 112 processes the signaling data supplied from the signaling generator 111, and supplies it to the Mux 117.

Note that as the signaling data, the SCD, RRD, and EAD transmitted as the LLS, and the USBD, MPD, SDP, and SPD transmitted as the SCS are generated, for example. It should be noted that the data providing server 30 may generate the signaling data. In this case, the signaling generator 111 supplies, to the signaling processing unit 112 as it is, the signaling data supplied from the data providing server 30.

In Step S113, the video data acquisition unit 113 acquires video data serving as a component from storage or the like, and supplies it to the video encoder 114. The audio data acquisition unit 115 acquires audio data serving as a component from storage or the like, and supplies it to the audio encoder 116.

In Step S114, the video encoder 114 encodes the video data supplied from the video data acquisition unit 113 in compliance with the encoding method such as MPEG, and supplies it to the Mux 117. The audio encoder 116 encodes the audio data supplied from the audio data acquisition unit 115 in compliance with the encoding method such as MPEG, and supplies it to the Mux 117.

In Step S115, the Mux 117 multiplexes the signaling data supplied from the signaling processing unit 112, the video data supplied from the video encoder 114, and the audio data supplied from the audio encoder 116 to generate the BBP stream in the IP transmission system, and supplies it to the transmission unit 118.

In Step S116, the transmission unit 118 transmits the BBP stream supplied from the Mux 117 as the digital broadcasting signal (broadcast wave) via the antenna 119. When the processing of Step S116 is finished, the transmission processing shown in FIG. 17 is finished.

Note that in the digital broadcasting signal, the filtering information such as the compression information (CO), the type information (Type), the extended filter information (Filter_Extension), and the version information (Data_Version) is provided in the LLS header of the LLS packet in which the file data of SCD, RRD, and EAD transmitted as the LLS is stored.

In the above, the transmission processing has been described.

(Initial Scanning Processing)

Figure 18:
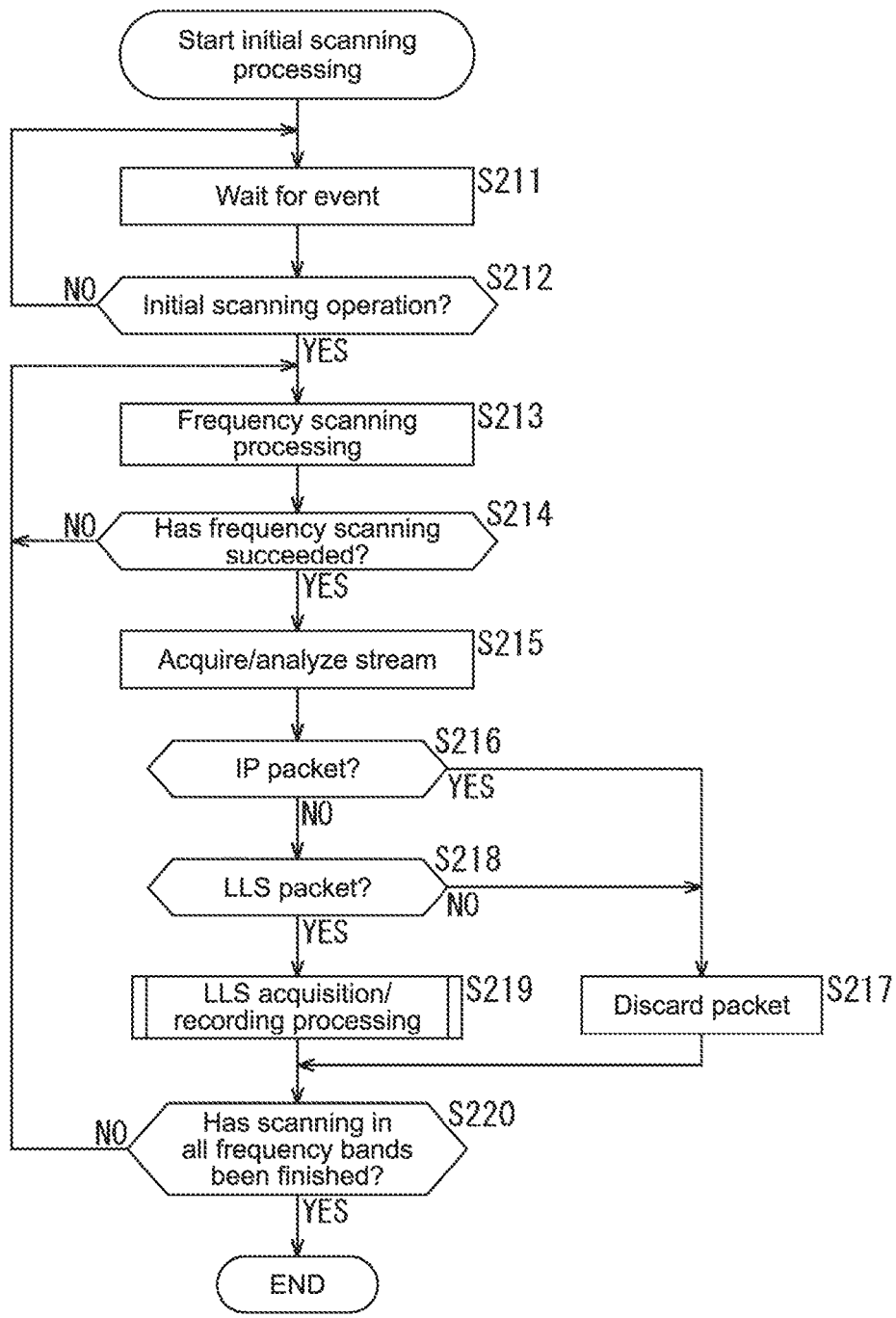
FIG. 18 A flowchart explaining initial scanning processing.

Next, the initial scanning processing performed by the reception apparatus 20 in FIG. 14 will be described with reference to the flowchart shown in FIG. 18.

In Step S211, the control unit 214 monitors the operation signal supplied from the input unit 216, and waits until initial scanning processing is performed by the user. In the case where the initial scanning processing is performed by the user in Step S212, the processing proceeds to Step S213.

In Step S213, the tuner 212 performs frequency scanning processing under the control of the control unit 214. In step S214, whether or not the frequency scanning has succeeded by the frequency scanning processing of Step S213 is determined.

In Step S214, in the case where it is determined that the frequency scanning has failed, the processing returns to Step S213, and the frequency scanning processing is performed again. On the other hand, in the case where it is determined that the frequency scanning processing has succeeded, the processing proceeds to Step S215.

In Step S215, the Demux 213 acquires and analyzes the BBP stream supplied from the tuner 212 under the control of the control unit 214. In Step S216, whether or not an IP packet has been extracted from the BBP stream as an analysis result of Step S215 is determined.

In the case where it is determined that the IP packet has been extracted in Step S216, the processing proceeds to Step S217. In Step S217, the Demux 213 discards the extracted IP packet. On the other hand, in the case where it is determined that a packet other than the IP packet has been extracted in Step S216, the processing proceeds to Step S218.

In Step S218, whether or not an LLS packet has been extracted from the BBP stream as an analysis result of Step S215 is determined.

In the case where it is determined that a packet other than the LLS packet has been extracted in Step S218, the processing proceeds to Step S217. In Step S217, the Demux 213 discards the extracted packet other than the LLS packet. On the other hand, in the case where it is determined that the LLS packet has been extracted in Step S218, the processing proceeds to Step S219.

In Step S219, the Demux 213 and the control unit 214 perform the LLS acquisition/storing processing. In this LLS acquisition/storing processing, filtering processing is performed on the basis of the filtering information of the LLS header added to the LLS packet, and the LLSs (SCD, RRD, and EAD) acquired by the filtering processing are stored in the NVRAM 215. Note that the detailed content of the LLS acquisition/storing processing will be described later with reference to the flowchart shown in FIG. 19.

When the processing of Step S217 or Step S219 is finished, the processing proceeds to Step S220. In Step S220, whether or not scanning in all frequency bands has been finished is determined.

In the case where it is determined that scanning in all frequency bands has not been finished in Step S220, the processing returns to Step S213, and the processing of Step S213 and subsequent steps are performed again. With this, scan processing in each frequency band is performed. In the case where it is determined that scanning in all frequency bands has been finished in Step S220, the initial scanning processing shown in FIG. 18 is finished.

In the above, the initial scanning processing has been described.

(LLS Acquisition/Storing Processing)

Figure 19:
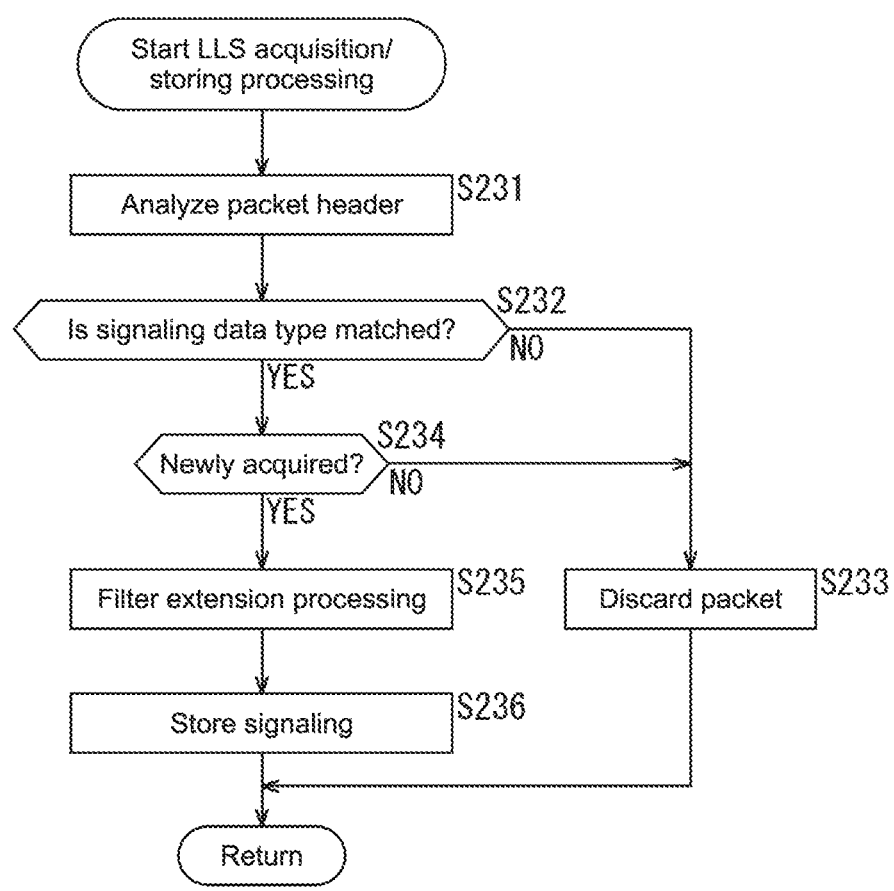
FIG. 19 A flowchart explaining LLS acquisition/storing processing.

Next, the detailed content of the LLS acquisition/storing processing corresponding to Step S219 shown in FIG. 18 will be described with reference to the flowchart shown in FIG. 19.

In Step S231, the Demux 213 analyzes the LLS header of the LLS packet under the control of the control unit 214.

In Step S232, whether or not the type of signaling data is matched as an analysis result of Step S231 is determined. That is, because the type information (Type) is provided in the LLS header of the LLS packet, Type="0" to "3" is registered in the filtering condition, and whether or not the target signaling data has been extracted is monitored.

In the case where it is determined that the type of the signaling data is different in Step S232, the processing proceeds to Step S233. In Step S233, the Demux 213 discards the extracted LLS packet. On the other hand, in the case where it is determined that the type of the signaling data is matched, the processing proceeds to Step S234.

In Step S234, whether or not the target signaling data is newly acquired as an analysis result of Step S231 is determined. That is, because the version information (Data_Version) is provided in the LLS header of the LLS packet, the latest version is registered in the filtering condition, and whether or not the target signaling data has been updated is monitored.

In the case where it is determined that the target signaling data has been acquired in Step S234, the processing proceeds to Step S233. In Step S233, the Demux 213 discards the extracted LLS packet. On the other hand, in the case where it is determined that the target signaling data has been newly acquired in Step S234, the processing proceeds to Step S235.

In Step S235, filtering processing is performed under the filtering condition of the extended filter information (Filter_Extension) as an analysis result of Step S231.

In Step S236, the control unit 214 stores the signaling data acquired by the filtering processing of Step S235 in the NVRAM 215. Accordingly, the channel selection information included in the SCD or the like is stored in the NVRAM 215. When the processing of Step S233 or Step S236 is finished, the processing returns to Step S219 in FIG. 18, and the subsequent processing is performed.

In the above, the LLS acquisition/storing processing has been described.

(EAD Acquisition Processing)

Figure 20:
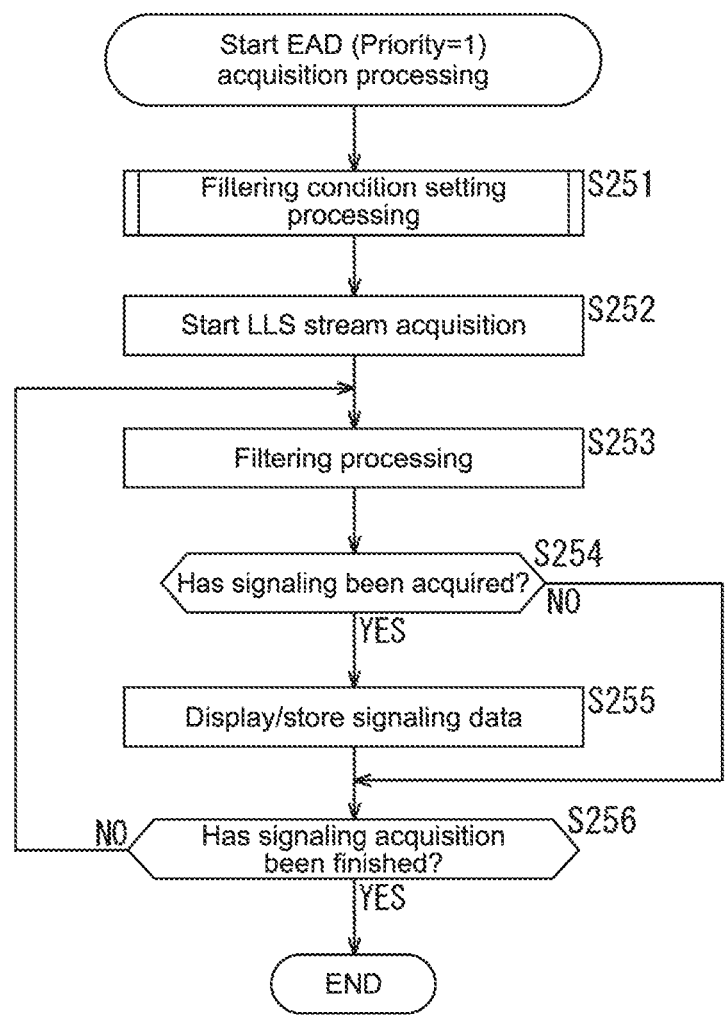
FIG. 20 A flowchart explaining EAD acquiring processing.

Next, the EAD acquisition processing performed by the reception apparatus 20 in FIG. 14 will be described with reference to the flowchart shown in FIG. 20.

In Step S251, the Demux 213 and the control unit 214 perform the filtering condition setting processing. In this filtering condition setting processing, Type="3" serving as the type information (Type) and Priority="1" serving as the extended filter information (Filter_Extension) are set as the filtering condition, for example. Note that the detailed content of the filtering condition setting processing will be described later with reference to the flowchart shown in FIG. 21.

In Step S252, the Demux 213 starts acquiring the stream of the LLS packet from the BBP stream supplied from the tuner 212, under the control of the control unit 214.

In Step S253, the Demux 213 performs filtering processing on the LLS packet on the basis of the filtering condition set in the processing of Step S251, under the control of the control unit 214. The filtering processing is performed on the LLS packet in which Type="3" serving as the type information (Type) and Priority="1" serving as the extended filter information (Filter_Extension) are provided in the LLS header.

In Step S254, whether or not the target signaling data has been acquired in the filtering processing of Step S253 is determined.

In the case where it is determined that the target signaling data has been acquired in Step S254, the processing proceeds to Step S255. In Step S255, the control unit 214 displays, on the display, the information corresponding to the target signaling data acquired in the filtering processing of Step S253.

For example, the EAD having priority of "1" is acquired, and the information relating to the emergency notice is displayed on the display. The control unit 214 stores the target signaling data in the NVRAM 215. When the processing of Step S255 is finished, the processing proceeds to Step S256.

Note that in the case where it is determined that the target signaling data has not been acquired in Step S254, the processing of Step S255 is skipped and the processing proceeds to Step S256. In Step S256, whether or not the acquisition of the target signaling data is finished.

In the case where it is determined that the acquisition of the target signaling data is continued, the processing returns to Step S253, and the subsequent processing is performed again. On the other hand, in the case where it is determined that the acquisition of the target signaling data is finished in Step S256, the EAD acquisition processing shown in FIG. 20 is finished.

In the above, the EAD acquisition processing has been described.

(Filtering Condition Setting Processing)

Next, the detailed content of the filtering condition setting processing corresponding to Step S251 in FIG. 20 will be described with reference to the flowchart shown in FIG. 21.

In Step S271, the Demux 213 sets the filtering condition under the control of the control unit 214. As the filtering condition, Type="3" serving as the type information (Type) and Priority="1" serving as the extended filter information (Filter_Extension) are set.

In Step S272, whether or not the filtering condition setting processing of Step S271 has succeeded is determined. In the case where it is determined that the filtering condition setting processing has succeeded in Step S272, the processing returns to Step S251 in FIG. 20, and the subsequent processing is performed. On the other hand, in the case where it is determined that the filtering condition setting processing has failed in Step S272, the processing proceeds to Step S273.

Figure 21:
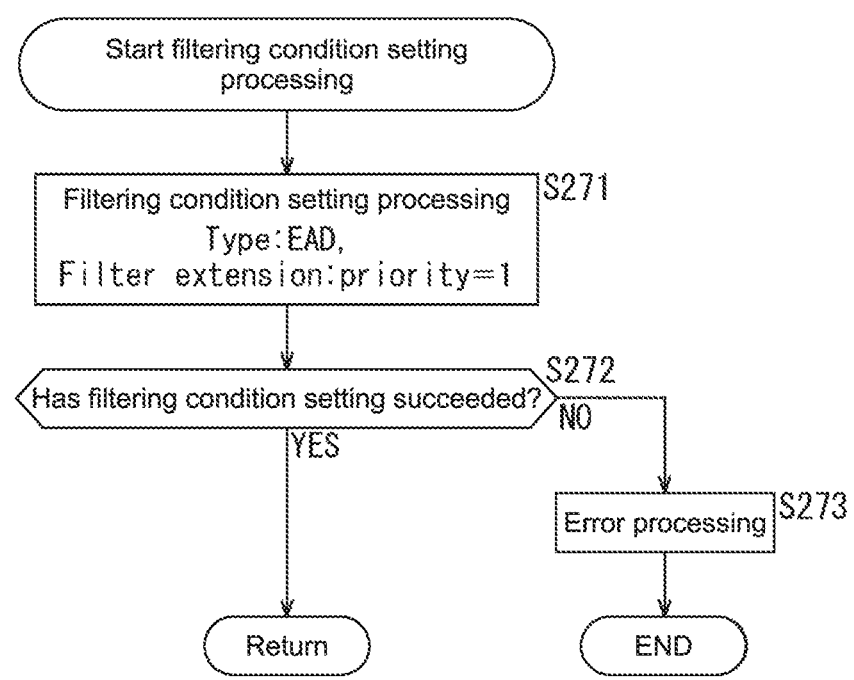
FIG. 21 A flowchart explaining filtering condition setting processing.

In Step S273, the Demux 213 performs error processing for the failed filtering condition setting processing under the control of the control unit 214, and the filtering condition setting processing shown in FIG. 21 is finished. Note that in this case, the EAD acquisition processing shown in FIG. 20 may be forced to be finished, or the processing of Step S251 shown in FIG. 20 may be performed.

In the above, the filtering condition setting processing has been described.

Note that although "D" that is the abbreviation of Description is used as the name of the signaling data in the above description, "T" that is the abbreviation of Table may be used. For example, the SCD (Service Configuration Description) may be described as an SCT (Service Configuration Table). Further, for example, the SPD (Service Parameter Description) may be described as an SPT (Service Parameter Table). It should be noted that the difference of those names is a formal difference between "Description" and "Table" and the substantial contents of the signaling information items are not different. Further, in the above description, the ESG has been described as the signaling data.

7. CONFIGURATION OF COMPUTER

The above-mentioned series of processing may be executed by hardware or may be executed by software. If the series of processing is executed by software, programs configuring that software are installed into a computer. The computer includes a computer incorporated in dedicated hardware and a computer capable of executing various functions by installing various programs, e.g., general purpose computer.

Figure 22:
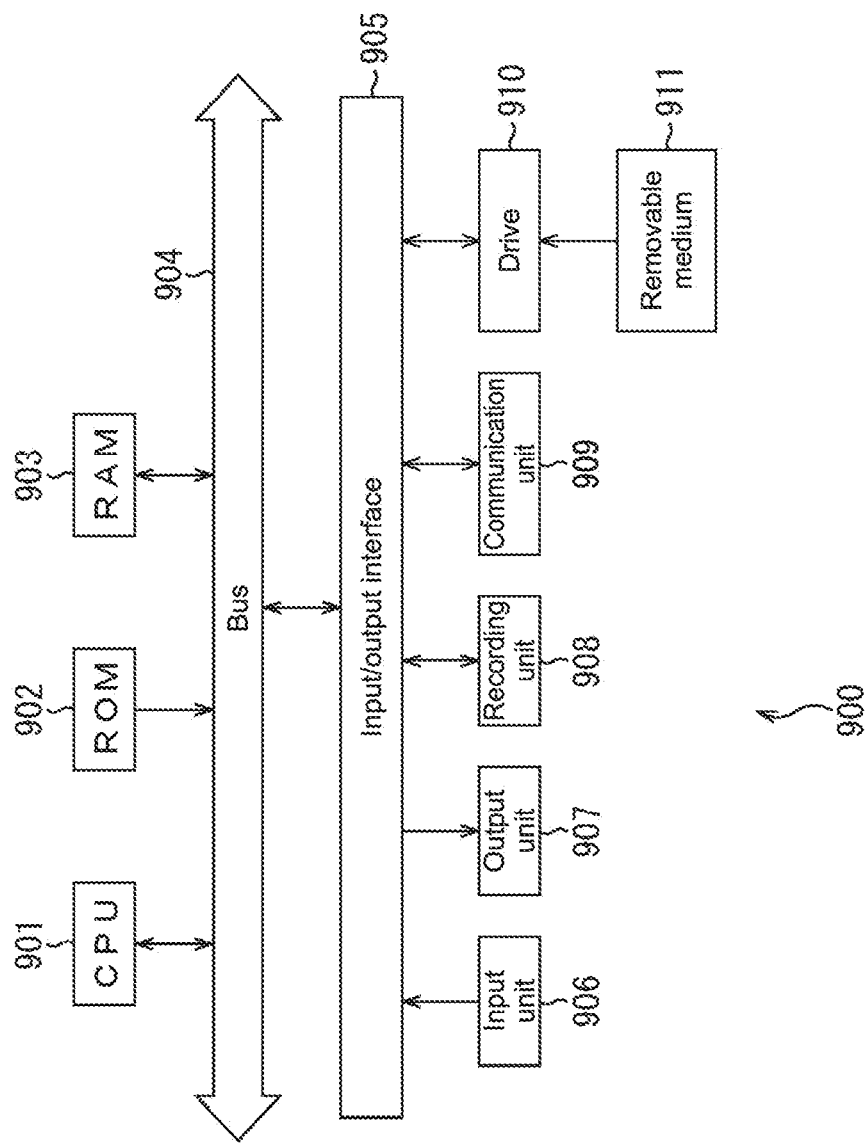
FIG. 22 A diagram showing a configuration example of a computer.

FIG. 22 is a diagram showing a configuration example of hardware of a computer that executes the above-mentioned series of processing according to the programs.

In a computer 900, a CPU (Central Processing Unit) 901, a ROM (Read Only Memory) 902, and a RAM (Random Access Memory) 903 are connected to one another via a bus 904. An input/output interface 905 is further connected to the bus 904. An input unit 906, an output unit 907, a recording unit 908, a communication unit 909, and a drive 910 are connected to the input/output interface 905.

The input unit 906 is constituted of a keyboard, a mouse, a microphone, and the like. The output unit 907 is constituted of a display, a speaker, and the like. The recording unit 908 is constituted of a hard disk, a nonvolatile memory, and the like. The communication unit 909 is constituted of a network interface and the like. The drive 910 drives a removable medium 911 such as a magnetic disk, an optical disc, a magneto-optical disk, and a semiconductor memory.

In the thus configured computer 900, the above-mentioned series of processing is performed by the CPU 901 loading programs stored in, for example, the recording unit 908 into the RAM 903 via the input/output interface 905 and the bus 904 and executing them.

The programs executed by the computer 900 (CPU 901) can be recorded and provided on the removable medium 911 as a package medium, for example. Further, the programs can be provided via a wired or wireless transmission medium such as a local-area network, the Internet, and digital satellite broadcasting.

In the computer 900, the programs can be installed into the recording unit 908 via the input/output interface 905 by the removable medium 911 being mounted on the drive 910. Further, the programs can be received by the communication unit 909 via the wired or wireless transmission medium and installed into the recording unit 908. Otherwise, the programs can be installed into the ROM 902 or the recording unit 908 in advance.

Note that the program executed by the computer 900 may be a program in which processing is chronologically performed in the order described herein or may be a program in which processing is performed in parallel or at a necessary timing, for example, upon calling.

In the present specification, the processing steps describing the program for causing the computer 900 to execute the various types of processing do not necessarily need to be performed in time series in the order described as the flowcharts and also include processing that are performed in parallel or individually (e.g., parallel processing or processing that uses object).

Further, the programs may be processed by a single computer or may be processed by a plurality of computers in a distributed manner. Further, the programs may be transferred to a remote computer to be executed.

Further, in the specification, the "system" refers to a group of a plurality of constituent elements (apparatus, module (component), etc.), and whether or not all constituent elements are provided in the same casing is irrelevant. Therefore, a plurality of apparatuses that are accommodated in different casings and connected via a network and a single apparatus in which a plurality of modules are accommodated in a single casing are both referred to as system.

Note that embodiments of the present technology are not limited to the above-mentioned embodiments and various modifications can be made without departing from the essence of the present technology. For example, the present technology can take a cloud computing structure in which one function is shared and processed cooperatively by a plurality of apparatuses via a network.

The steps described in the above-mentioned flowcharts can be assigned to and executed by a plurality of apparatuses instead of executing them by a single apparatus. Further, when a single step includes a plurality of processing, the plurality of processing included in the single step can be assigned to and executed by a plurality of apparatuses instead of executing them by a single apparatus.

It should be noted that the present technology may take the following configurations.

(1)

A reception apparatus, including: a reception unit that receives a broadcast wave of digital broadcasting using an IP (Internet Protocol) transmission system; and a filtering processing unit that performs filtering processing on a packet by using filtering information, the filtering information being provided in a header of the packet, the packet being transmitted in a baseband stream in a first layer via the broadcast wave, the first layer being lower than an IP layer in a hierarchy of a protocol of the IP transmission system.

(2)

The reception apparatus according to (1), in which the packet is an LLS (Low Layer Signaling) packet, the filtering information is provided in an LLS header of the LLS packet, first signaling data is provided in an LLS payload of the LLS packet, and the filtering processing unit performs filtering processing on the first signaling data stored in the LLS packet by using the filtering information provided in the LLS header.

(3)

The reception apparatus according to (2), in which the filtering information includes at least one piece of information of compression information, type information, extended filter information, and version information, the compression information representing whether or not the first signaling data is compressed, the type information representing a type of the first signaling data, the extended filter information representing extended filtering information set for each type of the first signaling data, the version information representing a version of the first signaling data.

(4)

The reception apparatus according to (3), in which information representing priority is specified in the extended filter information.

(5)

The reception apparatus according to (3) or (4), in which information for identifying a region is specified in the extended filter information.

(6)

The reception apparatus according to any one of (3) to (5), in which an arbitrarily defined filter ID and a value of the filter ID are specified in relation to each other in the extended filter information.

(7)

The reception apparatus according to any one of (2) to (6), in which first information, second information, and third information are transmitted in the first signaling data, the first information representing a configuration of the stream and a configuration of a service, the service being included in the stream, the second information representing rating information, the third information representing information on emergency notice.

(8)

The reception apparatus according to (7), in which the first information is SCD (Service Configuration Description), the second information is RRD (Region Rating Description), and the third information is EAD (Emergency Alerting Description).

(9)

The reception apparatus according to any one of (2) to (8), in which second signaling data is transmitted in a second layer through a FLUTE (File Delivery over Unidirectional Transport) session, the second layer being higher than the IP layer.

(10)

A reception method for a reception apparatus, including the steps of, by the reception apparatus:

receiving a broadcast wave of digital broadcasting using an IP transmission system; and performing filtering processing on a packet by using filtering information, the filtering information being provided in a header of the packet, the packet being transmitted in a baseband stream in a first layer via the broadcast wave, the first layer being lower than an IP layer in a hierarchy of a protocol of the IP transmission system.

(11)

A transmission apparatus, including:

a first acquisition unit that acquires one or more components constituting a service;

a second acquisition unit that acquires first signaling data; and a transmission unit that transmits the first signaling data as well as the one or more components via a broadcast wave of digital broadcasting using an IP transmission system, the first signaling data being stored in a packet, filtering information being provided in a header of the packet, the filtering information being used to perform filtering processing on the packet, the packet being transmitted in a baseband stream in a first layer via the broadcast wave, the first layer being lower than an IP layer in a hierarchy of a protocol of the IP transmission system.

(12)

The transmission apparatus according to (11), in which the packet is an LLS packet, the filtering information is provided in an LLS header of the LLS packet, and first signaling data is provided in an LLS payload of the LLS packet.

(13)

The transmission apparatus according to (12), in which the filtering information includes at least one piece of information of compression information, type information, extended filter information, and version information, the compression information representing whether or not the first signaling data is compressed, the type information representing a type of the first signaling data, the extended filter information representing extended filtering information set for each type of the first signaling data, the version information representing a version of the first signaling data.

(14)

The transmission apparatus according to (13), in which information representing priority is specified in the extended filter information.

(15)

The transmission apparatus according to (13) or (14), in which information for identifying a region is specified in the extended filter information.

(16)

The transmission apparatus according to any one of (13) to (15), in which an arbitrarily defined filter ID and a value of the filter ID are specified in relation to each other in the extended filter information.

(17)

The transmission apparatus according to any one of (12) to (16), in which first information, second information, and third information are transmitted in the first signaling data, the first information representing a configuration of the stream and a configuration of a service, the service being included in the stream, the second information representing rating information, the third information representing information on emergency notice.

(18)

The transmission apparatus according to (17), in which the first information is SCD, the second information is RRD, and the third information is EAD.

(19)

The transmission apparatus according to any one of (12) to (18), in which second signaling data is transmitted in a second layer through a FLUTE (File Delivery over Unidirectional Transport) session, the second layer being higher than the IP layer.

(20)

A transmission method for a transmission apparatus, including the steps of, by the transmission apparatus:

acquiring one or more components constituting a service;

acquiring first signaling data; and transmitting the first signaling data as well as the one or more components via a broadcast wave of digital broadcasting using an IP transmission system, the first signaling data being stored in a packet, filtering information being provided in a header of the packet, the filtering information being used to perform filtering processing on the packet, the packet being transmitted in a baseband stream in a first layer via the broadcast wave, the first layer being lower than an IP layer in a hierarchy of a protocol of the IP transmission system.

DESCRIPTION OF REFERENCE NUMERALS

1 broadcast communication system, 10 transmission apparatus, 20 reception apparatus, 30 data providing server, 40 streaming server, 90 network, 111 signaling generator, 113 video data acquisition unit, 115 audio data acquisition unit, 117 Mux, 118 transmission unit, 212 tuner, 213 Demux, 214 control unit, 217 communication unit, 218 Demux, 219 video decoder, 220 video output unit, 221 audio decoder, 222 audio output unit, 900 computer, 901 CPU

The invention claimed is:

1. A reception apparatus, comprising:

reception circuitry configured to receive a broadcast wave of digital broadcasting using an IP (Internet Protocol) transmission system; and processing circuitry configured to perform filtering processing on packets by using filtering information provided in headers of the respective packets, the packets being transmitted via the broadcast wave and carrying low layer signaling (LLS) information in payloads of the respective packets, wherein the LLS information includes:

first information representing a configuration of a service, the first information being a service configuration description, second information representing region rating information, the second information being a region rating description, and third information representing emergency alert information, the third information being an emergency alerting description.

2. The reception apparatus according to claim 1, wherein the filtering information includes at least one of address information, port information, version information, compression information, or extended information.

3. The reception apparatus according to claim 1, wherein the LLS information is transmitted in a layer above a physical layer of the IP transmission system.

4. The reception apparatus according to claim 1, wherein further signaling data is transmitted through a FLUTE (File Delivery over Unidirectional Transport) session in a layer above an IP layer of the IP transmission system.

5. A reception method for a reception apparatus, the method comprising:

receiving, by reception circuitry, a broadcast wave of digital broadcasting using an IP (Internet Protocol) transmission system; and performing, by processing circuitry, filtering processing on packets by using filtering information provided in headers of the respective packets, the packets being transmitted via the broadcast wave and carrying low layer signaling (LLS) information in payloads of the respective packets, wherein the LLS information includes:

first information representing a configuration of a service, the first information being a service configuration description, second information representing region rating information, the second information being a region rating description, and third information representing emergency alert information, the third information being an emergency alerting description.

6. The reception method according to claim 5, wherein the filtering information includes at least one of address information, port information, version information, compression information, or extended information.

7. The reception method according to claim 5, wherein the LLS information is transmitted in a layer above a physical layer of the IP transmission system.

8. The reception method according to claim 5, wherein further signaling data is transmitted through a FLUTE (File Delivery over Unidirectional Transport) session in a layer above an IP layer of the IP transmission system.

9. A non-transitory computer-readable storage medium storing instructions which when executed by a processor cause the processor to perform a reception method, the reception method comprising:

receiving a broadcast wave of digital broadcasting using an IP (Internet Protocol) transmission system; and performing filtering processing on packets by using filtering information provided in headers of the respective packets, the packets being transmitted via the broadcast wave and carrying low layer signaling (LLS) information in payloads of the respective packets, wherein the LLS information includes:

first information representing a configuration of a service, the first information being a service configuration description, second information representing region rating information, the second information being a region rating description, and third information representing emergency alert information, the third information being an emergency alerting description.

10. The non-transitory computer-readable storage medium according to claim 9, wherein the filtering information includes at least one of address information, port information, version information, compression information, or extended information.

11. The non-transitory computer-readable storage medium according to claim 10, wherein further signaling data is transmitted through a FLUTE (File Delivery over Unidirectional Transport) session in a layer above an IP layer of the IP transmission system.

12. The non-transitory computer-readable storage medium according to claim 9, wherein the LLS information is transmitted in a layer above a physical layer of the IP transmission system.

* * * * *